United States Patent
Ran et al.

(10) Patent No.: US 12,243,418 B2
(45) Date of Patent: Mar. 4, 2025

(54) COORDINATED CONTROL FOR AUTOMATED DRIVING ON CONNECTED AUTOMATED HIGHWAYS

(71) Applicant: CAVH LLC, Fitchburg, WI (US)

(72) Inventors: Bin Ran, Fitchburg, WI (US); Hanchu Li, Madison, WI (US); Jin Guo, Madison, WI (US); Yang Cheng, Middleton, WI (US); Shen Li, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 558 days.

(21) Appl. No.: 17/498,082

(22) Filed: Oct. 11, 2021

(65) Prior Publication Data
US 2022/0114885 A1 Apr. 14, 2022

Related U.S. Application Data

(60) Provisional application No. 63/090,435, filed on Oct. 12, 2020.

(51) Int. Cl.
*G08G 1/01* (2006.01)
*B60W 10/04* (2006.01)
(Continued)

(52) U.S. Cl.
CPC ........... *G08G 1/0145* (2013.01); *B60W 10/04* (2013.01); *B60W 10/18* (2013.01); *B60W 10/20* (2013.01); *B60W 40/04* (2013.01); *B60W 50/14* (2013.01); *B60W 60/001* (2020.02); *G08G 1/0116* (2013.01); *G08G 1/096775* (2013.01); *B60W 2556/50* (2020.02)

(58) Field of Classification Search
CPC ............... G08G 1/0145; G08G 1/0116; G08G 1/096775; B60W 60/001; B60W 10/04; B60W 10/18; B60W 10/20; B60W 40/04; B60W 50/14; B60W 2556/50
See application file for complete search history.

(56) References Cited

U.S. PATENT DOCUMENTS

| 8,527,139 B1 | 9/2013 | Yousuf |
| 10,380,886 B2 | 8/2019 | Ran et al. |

(Continued)

FOREIGN PATENT DOCUMENTS

EP    2395472 A1    12/2011

OTHER PUBLICATIONS

Electronic Industries Association, Engineering Department. EIA/TIA-492AAAA. Detail Specification for 62.5-μm Core Diameter/125-μm Cladding Diameter Class la Multimode, Graded Index Optical Waveguide Fibers. Feb. 9, 1989. 18 Pages.
(Continued)

*Primary Examiner* — Hussein Elchanti
(74) *Attorney, Agent, or Firm* — Thomas A. Isenbarger; Casimir Jones, S.C.

(57) ABSTRACT

Provided herein is technology relating to automated driving and, more particularly, to an automated driving system comprising a Connected Automated Vehicle Subsystem that interacts in real-time with a Connected Automated Highway Subsystem to provide coordinated sensing; coordinated prediction and decision-making; and coordinated control for transportation management and operations and control of connected automated vehicles.

20 Claims, 14 Drawing Sheets

(51) Int. Cl.
   *B60W 10/18*     (2012.01)
   *B60W 10/20*     (2006.01)
   *B60W 40/04*     (2006.01)
   *B60W 50/14*     (2020.01)
   *B60W 60/00*     (2020.01)
   *G08G 1/0967*    (2006.01)

(56) References Cited

U.S. PATENT DOCUMENTS

| | | | |
|---|---|---|---|
| 10,692,365 B2 | 6/2020 | Ran et al. | |
| 10,867,512 B2 | 12/2020 | Ran et al. | |
| 2009/0125174 A1* | 5/2009 | Delean | G05D 1/0291 701/469 |
| 2010/0110105 A1* | 5/2010 | Kinnunen | G06F 3/0485 345/629 |
| 2012/0105639 A1 | 5/2012 | Stein et al. | |
| 2012/0166076 A1* | 6/2012 | Hardy | G01C 21/3415 701/414 |
| 2013/0141480 A1 | 6/2013 | Lin et al. | |
| 2014/0277888 A1* | 9/2014 | Dastoor | B60L 3/12 701/22 |
| 2015/0325753 A1 | 11/2015 | Lai et al. | |
| 2016/0019434 A1* | 1/2016 | Caldwell | G06V 10/462 345/474 |
| 2016/0154538 A1* | 6/2016 | Wang | G01C 21/3664 715/771 |
| 2017/0075195 A1 | 3/2017 | Stein et al. | |
| 2018/0012492 A1* | 1/2018 | Baldwin | G05D 1/0261 |
| 2018/0299284 A1* | 10/2018 | Wang | G08G 1/0112 |
| 2018/0336780 A1 | 11/2018 | Ran et al. | |
| 2019/0096238 A1 | 3/2019 | Ran et al. | |
| 2019/0170527 A1* | 6/2019 | Inoue | G08G 1/00 |
| 2019/0206254 A1* | 7/2019 | Tao | B60W 30/0956 |
| 2019/0244521 A1 | 8/2019 | Ran et al. | |
| 2019/0340921 A1 | 11/2019 | Ran et al. | |
| 2020/0005633 A1 | 1/2020 | Jin et al. | |
| 2020/0020227 A1* | 1/2020 | Ran | G08G 1/075 |
| 2020/0021961 A1 | 1/2020 | Li et al. | |
| 2020/0168081 A1 | 5/2020 | Ran et al. | |
| 2020/0207343 A1* | 7/2020 | Vassilovski | G05D 1/0088 |
| 2020/0239031 A1* | 7/2020 | Ran | G08G 1/0116 |
| 2020/0388161 A1* | 12/2020 | Kim | H04W 4/40 |
| 2021/0065547 A1 | 3/2021 | Ran et al. | |
| 2021/0311491 A1 | 10/2021 | Li et al. | |
| 2021/0314752 A1 | 10/2021 | Ran et al. | |
| 2021/0394797 A1 | 12/2021 | Ran et al. | |

OTHER PUBLICATIONS

Telecommunications Industry Association. ANSI/TIA/EIA-492AAAB. Detail Specification for 50-µm Core Diameter/125 um Cladding Diameter Class la Graded Index Multimode Optical Fibers. Sep. 30, 2002. 26 pages.

NXP Sensor Fusion for Kinetis MCUs, User Guide. Aug. 12, 2016. 1-114. (https://www.nxp.com/design/sensor-developer-resources/nxp-sensor-fusion:XTRSICSNSTLBOXX) Accessed Feb. 3, 2023.

Beijing Surestar Technology Co., Ltd. R-Fans-16 & R-Fans-32 Navigation Lidar User Manual. 43 pages. (https://www.isurestar.net/) accessed Feb. 3, 2023.

Beijing Surestar Technology Co., R-Fans/C-Fans, Navigation LiDAR. 2 Pages. (https://www.isurestar.net/) accessed Feb. 3, 2023.

TrafficLogix. Municipal Warning Cameras data sheet. (https://trafficlogix.com/sp-guardian-enforcer-camera-system/) accessed Feb. 3, 2023.

HDL-64E from Velodyne Lidar Data Sheet. 2014. 2 pages.

Hallereau, S. Mobileye EyEQ4 Processor Family. Tricam and MonocamVersion of Vision Processing. IC Report, Mar. 2019. 21 pages.

MK5 OBU from Cohda Wireless (cohdawireless.com) Accessed Feb. 3, 2023.

MK5 RSU from Cohda Wireless (cohdawireless.com) Accessed Feb. 3, 2023.

Optical Fiber from Cablesys (www.cablesys.com/fiber-patch-cables). Accessed Feb. 3, 2023.

Harman Automotive. Savari StreetWAVE (https://car.harman.com/solutions/connectivity/harman-savari-streetwave). Accessed Feb. 3, 2023.

AMS. TDC-GPX2 4-Channel Time-to-Digital Converter data sheet. (https://www.pmt-fl.com/time-to-digital-converters/tdc-gpx2-lidar-and-3d-lidar). Accessed Feb. 3, 2023.

SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806).

IEEE Computer Society, IEEE 802.11p Standard for Information Technology. Jul. 15, 2010. 51 pages.

* cited by examiner

COORDINATED CONTROL FOR AUTOMATED DRIVING ON CONNECTED AUTOMATED HIGHWAYS

This application claims priority to U.S. provisional patent application Ser. No. 63/090,435, filed Oct. 12, 2020, which is incorporated herein by reference in its entirety.

FIELD

Provided herein is technology relating to automated driving and, more particularly, to an automated driving system comprising a Connected Automated Vehicle Subsystem that interacts in real-time with a Connected Automated Highway Subsystem to provide coordinated sensing; coordinated prediction and decision-making; and coordinated control for transportation management and operations and control of connected automated vehicles.

BACKGROUND

Connected Automated Vehicles (CAV) that are capable of automated driving under certain conditions are in development. Usage of present CAV technologies is limited by costs (e.g., capital and/or energy costs) associated with the numerous sensors and computational devices provided on CAV and CAV performance is limited by the functional capabilities of sensors and computing resources provided on CAV. Further, attempts to address some of the limitations of CAVs at low intelligence levels by upgrading CAV hardware have had minimal effect because of technical limitations related to sensing and computing capabilities.

SUMMARY

Provided herein is a technology that combines sensing, prediction, planning, and control capabilities of Connected Automated Highways (CAH) and sensing, prediction, planning, and control capabilities of Connected Automated Vehicles (CAV) using communication exchange and information fusion to provide a coordinated control system for automated driving. With the support of the CAH (in some embodiments, with the support of an Intelligent Road Infrastructure Subsystem (IRIS)), automated driving is provided for CAVs having limited functions (e.g., CAV at low intelligence levels (e.g., at an intelligence level less than 2)).

Very recently, automated driving systems and methods have been developed to address some of these problems. For example, an Automated Driving System (ADS) and/or components thereof is/are described in U.S. patent application Ser. No. 15/628,331 (published as U.S. Pat. App. Pub. No. 20180336780 and issued as U.S. Pat. No. 10,380,886); Ser. No. 16/509,615 (published as U.S. Pat. App. Pub. No. 20190340921); Ser. No. 16/135,916 (published as U.S. Pat. App. Pub. No. 20190096238 and issued as U.S. Pat. No. 10,692,365); Ser. No. 16/267,836 (published as U.S. Pat. App. Pub. No. 2019-0244521 and issued as U.S. Pat. No. 10,867,512); Ser. No. 16/776,846 (published as U.S. Pat. App. Pub. No. 20200168081); Ser. No. 16/505,034 (published as U.S. Pat. App. Pub. No. 20200021961); 62/894,703 (to which U.S. patent application Ser. No. 16/996,684, published as U.S. Pat. App. Pub. No. 20210065547, claims priority); 63/004,551 (to which U.S. patent application Ser. No. 17/192,529 claims priority); 63/004,564 (to which U.S. patent application Ser. No. 17/192,441 claims priority); and 63/042,620 (to which U.S. patent application Ser. No. 17/328,625 claims priority), each of which is incorporated herein by reference.

In some embodiments, the technology provided herein relates to an ADS comprising CAV and CAH. In some embodiments, the ADS described herein comprises multiple types of sensors and computational devices deployed on CAV and multiple types of sensors and computational devices deployed on CAH. In some embodiments, the ADS integrates functions and capabilities of the CAV and CAH and integrates information and data provided by the CAV and CAH to coordinate sensing; coordinate prediction and decision-making; and coordinate control to provide automated driving for CAV. In some embodiments, combining the functions and information of CAVs and CAH as described herein provides a technology for the collaborative control of CAV, e.g., to provide an automated driving system for CAV. In some embodiments, the technology provides an automated driving system for CAV at an automated driving intelligence level of 3 or more.

Accordingly, in some embodiments, the technology relates to an automated driving system (ADS). In some embodiments, the ADS is configured to provide coordinated control of automated driving at an intelligence level S for connected automated vehicles (CAVs) operating at an intelligence level V on a connected automated highway (CAH) operating at an intelligence level I. In some embodiments, the intelligence level I is greater than the intelligence level V. In some embodiments, the intelligence level V is less than 2 (e.g., V is 1.5).

In some embodiments, the ADS comprises a connected automated highway (CAH) subsystem; and a connected automated vehicle (CAV) subsystem. In some embodiments, the ADS further comprises a traffic operation center (TOC). In some embodiments, the ADS further comprises a supporting subsystem. In some embodiments, the CAH subsystem comprises an intelligent road infrastructure system (IRIS) subsystem. In some embodiments, IRIS subsystem comprises a roadside intelligent unit (RIU), a traffic control center (TCC), and/or a traffic control unit (TCU). In some embodiments, the CAH subsystem comprises roads and road infrastructure. In some embodiments, the RIU is configured to sense and/or fuse traffic state information, communicate traffic state information, and/or issue control instructions (e.g., detailed and time-sensitive control instructions issued to individual vehicles). In some embodiments, the RIU comprises a coordinated sensing module, a computing and fusion module, a communication module, and/or a position module. In some embodiments, the TCU is configured to communicate information with another TCU, process information, receive instructions from a TCC, issue instructions, and/or integrate local and global control decisions. In some embodiments, the TCU comprises a data-exchange and control module, a communication module, a service management module, an application module, and/or an interactive interface.

In some embodiments, the TCC is configured to control hardware devices and/or functional service interaction of said IRIS system, support intelligence distribution, and/or execute automated driving control. In some embodiments, the TCC is configured for connectivity and/or data exchange. In some embodiments, the TCC comprises a data service module, a transmission module, a service management module, a management application module, and/or a user interaction interface.

In some embodiments, the ADS further comprises a CAV. In some embodiments, the CAV comprises a vehicle intelligent unit (VIU). In some embodiments, the VIU interacts with the CAH subsystem and cooperates with said IRIS subsystem to provide coordinated control of said CAV. In some embodiments, the VIU is configured to provide computing functions, communication functions, and/or execution functions for automated driving. In some embodiments, the VIU is supported by an onboard sensing module, an onboard computing module, an onboard execution module, and/or an onboard communication module. In some embodiments, the TOC is configured to exchange information in real time with a TCC; publish driving environment-related information to vehicles and/or an IRIS; calculate an automated driving service fee; collect and distribute external information; and/or provide roadway operations, maintenance management, construction services, and/or rescue services. In some embodiments, the external information is provided by an external agency. In some embodiments, the external agency is a meteorological station, broadcasting station, or government agency.

In some embodiments, the ADS is configured to provide coordinated sensing, coordinated prediction and decision-making, and/or coordinated control. In some embodiments, the ADS is configured to perform a coordinated sensing method, a coordinated prediction and decision-making method, and/or coordinated control method.

In some embodiments, coordinated sensing comprises collecting traffic state and/or environmental data to determine road position; determine dynamic traffic state; determine static traffic state; and/or detect and/or recognize obstacles. In some embodiments, coordinated sensing comprises determining vehicle location, velocity, acceleration, and/or state. In some embodiments, coordinated sensing comprises correcting traffic and/or vehicle location, velocity, acceleration, and/or state using vehicle motion sensing data and information. In some embodiments, coordinated sensing comprises detecting a traffic sign, a traffic light, and/or traffic infrastructure. In some embodiments, coordinated sensing comprises localizing a vehicle using a high-precision map. In some embodiments, coordinated sensing comprises localizing a vehicle using mapless localization. In some embodiments, coordinated sensing comprises sensing the environment and collecting information at a microscopic, mesoscopic, and macroscopic level. In some embodiments, coordinated sensing comprises cooperating with an IRIS and/or connected automated vehicles. In some embodiments, collecting information at a macroscopic level comprises collecting information describing traffic control measures, traffic congestion conditions, and/or drivable areas. In some embodiments, collecting information at a mesoscopic level comprises collecting information describing traffic capacity, traffic density, and/or traffic flow. In some embodiments, collecting information at a microscopic level comprises collecting information describing vehicle position, vehicle trajectory, and/or vehicle headway. In some embodiments, information describing vehicle position comprise a position of a first vehicle and information describing one or more other vehicle(s) near said first vehicle, adjacent to said first vehicle, and/or surrounding said first vehicle.

In some embodiments, the ADS provides coordinated sensing using an RIU to provide global traffic information and using a VIU to provide local traffic information. In some embodiments, global traffic information comprises external traffic status and environmental data; and/or a portion of internal information of CAVs. In some embodiments, traffic information comprises internal information of vehicles, driver status, and a portion of external environment information.

In some embodiments, information sensed by a VIU is transmitted to a CAV for identifying an emergency. In some embodiments, information sensed by a VIU and/or by a RIU is transmitted to a TCU. In some embodiments, information sensed by a VIU and/or by a RIU is transmitted using an IRIS subsystem. In some embodiments, information sensed by a VIU and/or by a RIU is transmitted from a TCU to a TCC. In some embodiments, the TCC performs information integration on said information sensed by a VIU and/or by a RIU with other information. In some embodiments, information integration comprises fusing information from a VIU and an RIU to provide traffic scene information. In some embodiments, information integration comprises fusing information from a VIU and an RIU to provide complete and/or substantially complete and/or essentially complete traffic scene information. In some embodiments, information integration comprises calibrating information sensed by a RIU using information sensed by a VIU. In some embodiments, information integration comprises using information perceived by a VIU as redundant safety information. In some embodiments, information integration comprises using information sensed by a RIU to correct and/or supplement external traffic information sensed by a VIU. In some embodiments, information integration comprises using information sensed by a RIU to correct and/or supplement incomplete external traffic information sensed by a VIU. In some embodiments, the VIU is fully or partially failing.

In some embodiments, coordinated prediction and decision-making comprises coordinating prediction and/or decision-making functions of CAV and IRIS. In some embodiments, coordinated prediction and decision-making comprises predicting traffic state and traffic behavior. In some embodiments, coordinated prediction and decision-making comprises predicting driving behavior. In some embodiments, coordinated prediction and decision-making comprises making decisions to manage traffic state and behavior. In some embodiments, coordinated prediction and decision-making comprises prediction and decision-making at a microscopic level, a mesoscopic level, and a macroscopic level. In some embodiments, prediction and decision-making at a macroscopic level comprises predicting traffic state, predicting network demand, and/or predicting driving environment. In some embodiments, prediction and decision-making at a macroscopic level comprises making decisions to form and/or manage a vehicle platoon trip; and/or to plan a vehicle path trajectory. In some embodiments, prediction and decision-making at a macroscopic level comprises obtaining and/or determining a traffic flow parameter by sensing and/or prediction. In some embodiments, prediction and decision-making at a mesoscopic level comprises predicting special events, predicting weather, predicting traffic formation, predicting traffic congestion, predicting lane changing by vehicles, and/or predicting car following behavior. In some embodiments, prediction and decision-making at a mesoscopic level comprises making decisions to control vehicles and/or traffic near special events, work areas, speed bumps, entrance ramps, and/or exit ramps. In some embodiments, prediction and decision-making at a microscopic level comprises predicting driver behavior, predicting vehicle trajectory, and/or predicting motion of surrounding vehicles. In some embodiments, prediction and decision-making at a microscopic level comprises lateral control of a vehicle and/or longitudinal control of a vehicle. In some embodiments, longitudinal control of a vehicle comprises tracking speed; maintaining vehicle distance; and/or managing automated driving lanes for safety, efficient traffic flow, and/or energy-saving driving. In some embodiments, lateral control of a vehicle comprises lane-keeping and/or lane-changing. In some embodiments, prediction and decision-making at a microscopic level comprises decision-making to provide vehicle lateral and longitudinal control parameters.

In some embodiments, coordinated prediction and decision-making comprises coordinating prediction and decision-making capabilities and/or functions of CAH and IRIS subsystem. In some embodiments, coordinated prediction and decision-making comprises coordinating prediction and decision-making capabilities and/or functions of TCC, IRIS subsystem, and VIU. In some embodiments, coordinated prediction and decision-making comprises use of multi-source sensing information from the IRIS subsystem and VIU. In some embodiments, coordinated prediction and decision-making comprises use of multi-mode threshold conditions. In some embodiments, coordinated prediction and decision-making comprises use of multi-mode threshold conditions for system safety and/or system efficiency. In some embodiments, the TCC is configured to perform macroscopic and/or mesoscopic prediction and decision-making. In some embodiments, the TCC is configured to plan and/or predict vehicle driving environment and road network traffic status. In some embodiments, the TCC is configured to provide vehicle driving environment and road network traffic status to CAV. In some embodiments, the TCC is configured to perform macroscopic-level functions comprising traffic road network scheduling, trip guidance, emergency rescue, event notification, and/or service functions. In some embodiments, the TCC is configured to perform mesoscopic-level functions comprising event prediction, congestion determination, and/or weather prediction. In some embodiments, the TCC is configured to manage CAV control commands and/or manage CAV platoon strategies. In some embodiments, the VIU is configured to perform microscopic prediction and decision-making. In some embodiments, microscopic prediction and decision-making comprises predicting vehicle trajectory. In some embodiments, microscopic prediction and decision-making comprises sensing and/or predicting the position, velocity, and/or acceleration of surrounding vehicles.

In some embodiments, coordinated prediction and decision-making comprises control of emergency braking and safe braking decisions by a CAV subsystem for CAV having an intelligence of 1 or more. In some embodiments, the CAV subsystem uses CAV sensing and prediction and/or CAV obstacle avoidance functions. In some embodiments, coordinated prediction and decision-making comprises control of vehicle operation decision-making by a CAV using sensing and prediction of said CAV. In some embodiments, the CAV performs decision-making to provide lateral control parameters and/or longitudinal control parameters for said CAV. In some embodiments, the VIU is configured to perform more microscopic prediction and decision-making than said TCC. In some embodiments, the TCC is configured to perform more macroscopic and mesoscopic prediction and decision-making than said VIU. In some embodiments, the VIU is configured to a portion of said microscopic prediction and decision-making. In some embodiments, the TCC is configured to perform all or substantially all or effectively all macroscopic and mesoscopic prediction and decision-making. In some embodiments, the TCC and said VIU coordinate to provide coordinated prediction of traffic at a microscopic scale. In some embodiments, TCC sensing data and VIU sensing data are fused to provide fused macroscopic and/or microscopic data describing traffic and/or vehicle characteristics. In some embodiments, the coordinated prediction of traffic at a microscopic scale is based on said fused macroscopic and/or microscopic data describing traffic characteristics. In some embodiments, CAV position, velocity, and/or acceleration is analyzed and/or predicted. In some embodiments, CAV lateral control and/or CAV longitudinal control is analyzed and/or predicted. In some embodiments, the TCC and said VIU coordinate to provide coordinated decision-making for road and traffic safety. In some embodiments, the TCC and said VIU coordinate to provide coordinated decision-making for smooth traffic flow. In some embodiments, the TCC and said VIU coordinate to provide coordinated decision-making for CAV vehicle following, CAV lane keeping, CAV lane changing, and/or CAV spacing on a road. In some embodiments, the TCC and said VIU coordinate to provide coordinated decision-making for microscopic control of CAV.

In some embodiments, the IRIS subsystem and CAV coordinate to provide safe CAV operation and traffic safety. In some embodiments, the IRIS subsystem and said CAV coordinate to provide prediction of intersection traffic and/or control of intersection traffic. In some embodiments, the IRIS subsystem and/or said CAV is configured to provide prediction and decision-making for safe obstacle avoidance. In some embodiments, the ADS is configured to provide prediction and decision-making for safe traffic behavior using obstacle avoidance prediction information provided by said IRIS and/or said CAV. In some embodiments, the ADS coordinates control of CAV by said CAV subsystem and control of CAV by said CAH subsystem. In some embodiments, the CAH subsystem is configured to control vehicles and/or traffic flow. In some embodiments, the CAH subsystem is configured to actively and dynamically distribute traffic on roads. In some embodiments, the CAV subsystem and said CAH subsystem coordinate to provide CAV control instructions (e.g., detailed and time-sensitive control instructions for individual vehicles). In some embodiments, the CAV control instructions comprise instructions for lateral control of CAV and/or instructions for longitudinal control of CAV. In some embodiments, the CAV control instructions are communicated through the CAH subsystem to CAV. In some embodiments, the ADS is configured to provide execution results of said CAV control instructions, detect said execution results, and backup said execution results.

In some embodiments, the CAH subsystem and said CAV subsystem coordinate to provide CAV control strategies for CAV and traffic safety. In some embodiments, CAV control strategies apply to road sections and road networks. In some embodiments, the ADS provides CAV control strategies for CAV and traffic safety during abnormal road conditions and/or during abnormal traffic conditions. In some embodiments, the ADS is configured to assign control functions to said CAV subsystem and said CAH subsystem. In some embodiments, the control functions provide accurate and safe automated driving of CAV. In some embodiments, the CAV subsystem and said CAH subsystem coordinate to control vehicles and/or traffic at a microscopic level, mesoscopic level, and/or macroscopic level. In some embodiments, the macroscopic level comprises controlling traffic flow, distributing traffic dynamically, managing traffic lanes, and/or allocating system resources. In some embodiments, the mesoscopic level comprises controlling vehicle platoons and/or controlling roadside infrastructure. In some embodiments, the microscopic level comprises controlling vehicle speed, controlling vehicle acceleration, controlling vehicle longitudinal position, and/or controlling vehicle lateral position. In some embodiments, a CAV receives instructions from an IRIS. In some embodiments, a VIU receives instructions from an IRIS and said VIU controls and/or adjusts CAV speed, acceleration, steering angle, vehicle longitudinal position, and/or vehicle lateral position.

In some embodiments, the technology relates to methods. For example, in some embodiments, the technology provides a method for coordinated control of CAV. In some embodiments, methods comprise distributing vehicle control and traffic management strategies from a TCC and implementing vehicle control and traffic management instructions by a RIU. In some embodiments, the vehicle control and traffic management strategies comprise vehicle control and traffic management instructions. In some embodiments, the vehicle control and traffic management strategies control vehicles and manage traffic at a microscopic level, mesoscopic level, and/or a macroscopic level. In some embodiments, the vehicle control and traffic management strategies comprise managing speed limit, managing traffic lanes, and/or managing traffic signals. In some embodiments, methods further comprise sending vehicle control instructions (e.g., detailed and time-sensitive control instructions for individual vehicles) from said RIU to a CAV. In some embodiments, methods further comprise executing said vehicle control instructions by a CAV. In some embodiments, methods further comprise detecting the status of vehicle control instruction execution by a RIU. In some embodiments, methods further comprise communicating said status of vehicle control instruction execution to said TCC. In some embodiments, methods further comprise alerting a vehicle by a RIU of an abnormal driving situation. In some embodiments, methods further comprise reporting said abnormal driving situation to said TCC. In some embodiments, the vehicle is a CAV receiving said vehicle control instructions. In some embodiments, the vehicle is a vehicle near to, adjacent, and/or surrounding said vehicle receiving said control instructions.

In some embodiments, the technology provides a method for coordinated control of CAV. In some embodiments, methods comprise sending vehicle control instructions (e.g., detailed and time-sensitive control instructions for individual vehicles) from a RIU to a VIU. In some embodiments, the control instructions comprise instructions for vehicle throttle, brake, and steering angle. In some embodiments, methods further comprise executing said control instructions by a CAV. In some embodiments, methods further comprise detecting an emergency situation. In some embodiments, the emergency situation is detected by a vehicle. In some embodiments, the emergency situation is detected by a CAV subsystem. In some embodiments, the emergency situation is detected by a CAH subsystem. In some embodiments, the emergency situation is detected by an IRIS subsystem. In some embodiments, methods further comprise executing emergency obstacle avoidance actions by a CAV. In some embodiments, an emergency obstacle avoidance module of said CAV provides vehicle control instructions for executing emergency obstacle avoidance actions by said CAV. In some embodiments, emergency avoidance actions comprise braking. In some embodiments, methods further comprise reporting said emergency situation to a TCC. In some embodiments, methods further comprise providing coordinated control of CAV by coordinating a CAV subsystem and a CAH subsystem. In some embodiments, an ADS performs said coordinating a CAV subsystem and a CAH subsystem. In some embodiments, methods further comprise providing coordinated control of CAV by coordinating a CAV subsystem and a CAH subsystem. In some embodiments, an ADS performs said coordinating a CAV subsystem and a CAH subsystem.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all steps, operations, or processes described.

In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet; CAVH, IRIS, or CAH communications; and/or a cellular network). See, e.g., U.S. Pat. App. Pub. No. 20200005633, incorporated herein by reference.

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

Figure 1:
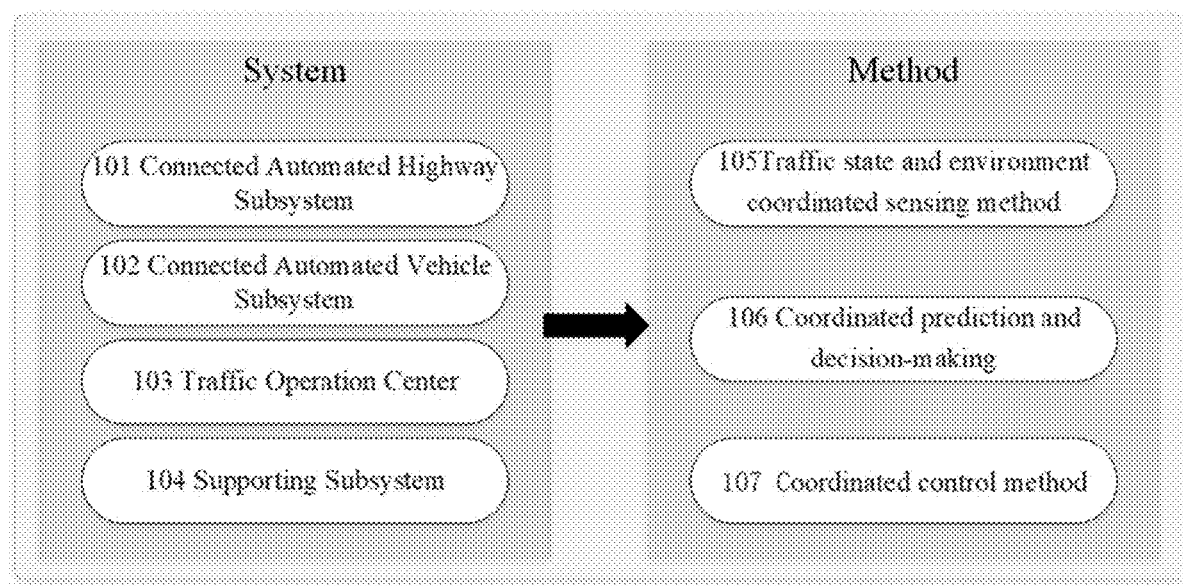
FIG. 1 shows an exemplary system structure of a coordinated control system and method for automated driving on a Connected Automated Highway. 101: Connected Automated Highway Subsystem; 102: Connected Automated Vehicle Subsystem; 103: Traffic Operation Center; 104: Supporting Subsystem; 105: Traffic state and environment coordinated sensing method; 106: Coordinated prediction and decision-making method; 107: Coordinated control method.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to automated driving and, more particularly, to an automated driving system comprising a Connected Automated Vehicle Subsystem that interacts in real-time with a Connected Automated Highway Subsystem to provide coordinated sensing; coordinated prediction and decision-making; and coordinated control for transportation management and operations and control of connected automated vehicles.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "Connected Automated Vehicle Highway System" ("CAVH System") refers to a comprehensive system providing full vehicle operations and control for connected and automated vehicles (CAV), and, more particularly, to a system controlling CAVs by sending individual vehicles with detailed and time-sensitive control instructions for vehicle following, lane changing, route guidance, and related information. A CAVH system comprises sensing, communication, and control components connected through segments and nodes that manage an entire transportation system. CAVH systems comprise four control levels: a) vehicle; b) roadside unit (RSU); c) traffic control unit (TCU); and d) traffic control center (TCC). See U.S. Pat. App. Pub. Nos. 20180336780, 20190244521, and/or 20190096238, each of which is incorporated herein by reference.

As used herein, the term "Intelligent Road Infrastructure System" ("IRIS") refers to a system that facilitates vehicle operations and control for CAVH systems. See U.S. Pat. App. Pub. Nos. 20190244521 and/or 20190096238, each of which is incorporated herein by reference.

As used herein, the term "GPS" refers to a global navigation satellite system (GNSS) that provides geolocation and time information to a receiver. Examples of a GNSS include, but are not limited to, the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "automated vehicle" (abbreviated as "AV") refers to an automated vehicle in an automated mode, e.g., at any level of automation (e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference)).

As used herein, the term "allocate", "allocating", and similar terms referring to resource distribution also include distributing, arranging, providing, managing, assigning, controlling, and/or coordinating resources.

As used herein, the term "connected vehicle" or "CV" refers to a connected vehicle, e.g., configured for any level of communication (e.g., V2V, V2I, and/or I2V).

As used herein, the term "connected and autonomous vehicle" or "CAV" refers to an autonomous vehicle that is able to communicate with other vehicles (e.g., by V2V communication), with roadside intelligent units (RIUs), traffic control signals, and/or other infrastructure (e.g., a CAH system, IRIS, and/or CAVH system) or devices. That is, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

As used herein, the term "data fusion" refers to integrating a plurality of data sources to provide information (e.g., fused data) that is more consistent, accurate, and useful than any individual data source of the plurality of data sources.

As used herein, the term "configured" refers to a component, module, system, subsystem, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "reliability" refers to a measure (e.g., a statistical measure) of the performance of a system without failure and/or error. In some embodiments, reliability is a measure of the length of time and/or number of functional cycles a system performs without a failure and/or error.

As used herein, the term "support" when used in reference to one or more components of the ADS and/or a vehicle providing support to and/or supporting one or more other components of the ADS and/or a vehicle refers to, e.g., exchange of information and/or data between components and/or levels of the ADS and/or vehicles, sending and/or receiving instructions between components and/or levels of the ADS and/or vehicles, and/or other interaction between components and/or levels of the ADS and/or vehicles that provide functions such as information exchange, data transfer, messaging, and/or alerting.

As used herein, the term "ADS component" or "component of an ADS" refers individually and/or collectively to one or more components of an ADS and/or CAVH system, e.g., a VIU, RIU, TCC, TCU, TCC/TCU, TOC, CAV, CAH, CAV Subsystem, CAH Subsystem, supporting subsystem, and/or cloud component.

As used herein, the term "critical point" refers to a portion or region of a road that is identified as appropriate to be provided embodiments of the function allocation technology provided herein. In some embodiments, a critical point is categorized as a "static critical point" and in some embodiments, a critical point is categorized as a "dynamic critical point". As used herein, a "static critical point" is a point (e.g., region or location) of a road that is a critical point based on identification of road and/or traffic conditions that are generally constant or that change very slowly (e.g., on a time scale longer than a day, a week, or a month) or only by planned reconstruction of infrastructure. As used herein, a "dynamic critical point" is a point (e.g., region or location) of a road that is a critical point based on identification of road conditions that change (e.g., predictably or not predictably) with time (e.g., on a time scale of an hour, a day, a week, or a month). Critical points based on historical crash data, traffic signs, traffic signals, traffic capacity, and road geometry are exemplary static critical points. Critical points based on traffic oscillations, real-time traffic management, or real-time traffic incidents are exemplary dynamic critical points.

In some embodiments, critical points are identified using, e.g., historical crash data (e.g., the top 20% (e.g., top 15-25% (e.g., top 15, 16, 17, 18, 19, 20, 21, 22, 23, 24, or 25%)) most frequent crash points in a road system are identified as critical points); traffic signs (e.g., where certain traffic signs (e.g., accident-prone areas) are detected are identified as critical points); traffic capacity (e.g., the top 20% (e.g., top 15-25% (e.g., top 15, 16, 17, 18, 19, 20, 21, 22, 23, 24, or 25%)) highest traffic capacity areas are identified as critical points); road geometry (e.g., roads with critical road geometry (e.g., curves, blind spots, hills, intersections (e.g., signalized intersections, stop sign intersections, yield sign intersections), roundabouts) are identified as critical points); traffic oscillation (e.g., points with significant traffic oscillations are identified as critical points); real-time traffic management (e.g., points with potential traffic management are identified as critical points); and/or real-time traffic incident (e.g., points with traffic incidents (e.g., accident, crash, congestion, construction or maintenance, weather-related event, etc.) or vehicle malfunction are identified as critical points).

As used herein, the terms "microscopic", "mesoscopic", and "macroscopic" refer to relative scales in time and space. In some embodiments, the scales include, but are not limited to, a microscopic level relating to individual vehicles (e.g., longitudinal movements (car following, acceleration and deceleration, stopping and standing) and lateral movements (lane keeping, lane changing)), a mesoscopic level relating to road corridors and/or segments (e.g., special event early notification, incident prediction, merging and diverging, platoon splitting and integrating, variable speed limit prediction and reaction, segment travel time prediction, and/or segment traffic flow prediction), and a macroscopic level relating to an entire road network (e.g., prediction of potential congestion, prediction of potential incidents, prediction of network traffic demand, prediction of network status, prediction of network travel time). In some embodiments, a time scale at a microscopic level is from 1 to 10 milliseconds and is relevant to tasks such as vehicle control instruction computation. In some embodiments, a time scale at a mesoscopic level is typically from 10 to 1000 milliseconds and is relevant to tasks such as incident detection and pavement condition notification. In some embodiments, a time scale at a macroscopic level is longer than 1 second and is relevant to tasks such as route computing.

As used herein, the automation and/or intelligence levels of vehicles (V), infrastructure (I), and system (S) are described with respect to an "intelligence level" and/or an "automation level". In some embodiments, the vehicle intelligence and/or automation level is one of the following: V0: No automation functions; V1: Basic functions to assist a human driver to control a vehicle; V2: Functions to assist a human driver to control a vehicle for simple tasks and to provide basic sensing functions; V3: Functions to sense the environment in detail and in real-time and to complete relatively complicated driving tasks; V4: Functions to allow vehicles to drive independently under limited conditions and sometimes with human driver backup; and V5: Functions to allow vehicles to drive independently without human driver backup under all conditions. As used herein, a vehicle having an intelligence level of 1.5 (V1.5) refers to a vehicle having capabilities between vehicle intelligence 1 and vehicle intelligence level 2, e.g., a vehicle at V1.5 has minimal or no automated driving capability but comprises capabilities and/or functions (e.g., hardware and/or software) that provide control of the V1.5 vehicle by a CAVH system (e.g., the vehicle has "enhanced driver assistance" or "driver assistance plus" capability).

In some embodiments, the infrastructure intelligence and/or automation level is one of the following: I0: No functions; I1: Information collection and traffic management wherein the infrastructure provides primitive sensing functions in terms of aggregated traffic data collection and basic planning and decision making to support simple traffic management at low spatial and temporal resolution; I2: I2X and vehicle guidance for driving assistance, wherein, in addition to functions provided in I1, the infrastructure realizes limited sensing functions for pavement condition detection and vehicle kinematics detection, such as lateral and/or longitudinal position, speed, and/or acceleration, for a portion of traffic, in seconds or minutes; the infrastructure also provides traffic information and vehicle control suggestions and instructions for the vehicle through I2X communication; I3: Dedicated lane automation, wherein the infrastructure provides individual vehicles with information describing the dynamics of surrounding vehicles and other objects on a millisecond time scale and supports full automated driving on CAVH-compatible vehicle dedicated lanes; the infrastructure has limited transportation behavior prediction capability; I4: Scenario-specific automaton wherein the infrastructure provides detailed driving instructions for vehicles to realize full automated driving in certain scenarios and/or areas, such as locations comprising predefined geofenced areas, where the traffic is mixed (e.g., comprises automated and non-automated vehicles); essential vehicle-based automation capability, such as emergency braking, is provided as a backup system in case the infrastructure fails; and I5: Full infrastructure automation wherein the infrastructure provides full control and management of individual vehicles under all scenarios and optimizes a whole road network where the infrastructure is deployed; vehicle automation functionality is not necessary provided as a backup; full active safety functions are available.

In some embodiments, the system intelligence and/or automation level is one of the following: S0: no function; S1: the system provides simple functions for individual vehicles such as cruise control and passive safety function; the system detects the vehicle speed, location, and distance; S2: the system comprises individual intelligence and detects vehicle functioning status, vehicle acceleration, and/or traffic signs and signals; individual vehicles make decisions based on their own information and have partially automated driving to provide complicated functions such as assisting vehicle adaptive cruise control, lane keeping, lane changing, and automatic parking; S3: the system integrates information from a group of vehicles and behaves with ad-hoc intelligence and prediction capability, the system has intelligence for decision making for the group of vehicles and can complete complicated conditional automated driving tasks such as cooperative cruise control, vehicle platooning, vehicle navigation through intersections, merging, and diverging; S4: the system integrates driving behavior optimally within a partial network; the system detects and communicates detailed information within the partial network and makes decisions based on both vehicle and transportation information within the network and handles complicated, high level automated driving tasks, such as navigating traffic signal corridors, and provides optimal trajectories for vehicles within a small transportation network; S5: vehicle automation and system traffic automation, wherein the system optimally manages an entire transportation network; the system detects and communicates detailed information within the transportation network and makes decisions based on all available information within the network; the system handles full automated driving tasks, including individual vehicle tasks and transportation tasks, and coordinates all vehicles to manage traffic.

In some embodiments, the system dimension is dependent on the vehicle and infrastructure dimensions, e.g., as represented by the following equation (S=system automation; V=vehicle intelligence; and I=infrastructure intelligence):

$$S=f(V,I)$$

In some embodiments, vehicle intelligence is provided by and/or related to the CAV Subsystem and the infrastructure intelligence is provided by and/or related to the CAH Subsystem. One of ordinary skill in the art may refer to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), which provides additional understanding of terms used in the art and herein.

Description

Provided herein is a technology providing an automated driving system (ADS). In some embodiments, the ADS is supported by an intelligent network road system comprising CAV, CAH, and/or a Traffic Operation Center (TOC). In some embodiments, CAV comprise a Vehicle Intelligent Unit (VIU) that provides automated driving capabilities to CAV. Accordingly, in some embodiments, the ADS components (e.g., hardware, software, subsystems) collaborate to provide systems and methods for collaborative automated driving, e.g., to provide coordinated sensing; coordinated prediction and decision-making; and coordinated control for transportation management and operations and control of connected automated vehicles.

For instance, in some embodiments, the ADS comprises a Connected Automated Vehicle Subsystem that interacts in real-time with a Connected Automated Highway Subsystem to provide coordinated sensing; coordinated prediction and decision-making; and coordinated control for transportation management and operations and control of connected automated vehicles. In some embodiments, the Connected Automated Highway Subsystem comprises an Intelligent Road Infrastructure Subsystem (IRIS) comprising Roadside Intelligent Units (RIU), a Traffic Control Unit (TCU), and a Traffic Control Center (TCC). In some embodiments, the ADS is supported by a data information fusion computing platform comprising cloud computing, wired and wireless real-time communication networks, electricity supply networks, network security systems, high-precision maps, and/or high-precision positioning services. In some embodiments, the ADS provides one or more intelligent connected vehicle collaborative methods and/or system functions for automated driving, e.g., sensing traffic state and environment; predicting traffic behavior and making decisions; and coordinating control of traffic and vehicles.

In some embodiments, e.g., as shown in FIG. 1, the technology provides coordinated control for automated driving on a connected automated highway. In some embodiments, the technology provides a system having a structure as shown in FIG. 1, e.g., comprising a Connected and Automated Highway Subsystem 101, a Connected and Automated Vehicle Subsystem 102, a Traffic Operation Center 103, and a Supporting Subsystem 104. In some embodiments, the system is configured to perform methods for coordinated control of automated driving, e.g., methods for including traffic state and environment coordinated sensing 105, coordinated prediction and decision-making 106, and coordinated control 107.

Figure 2:
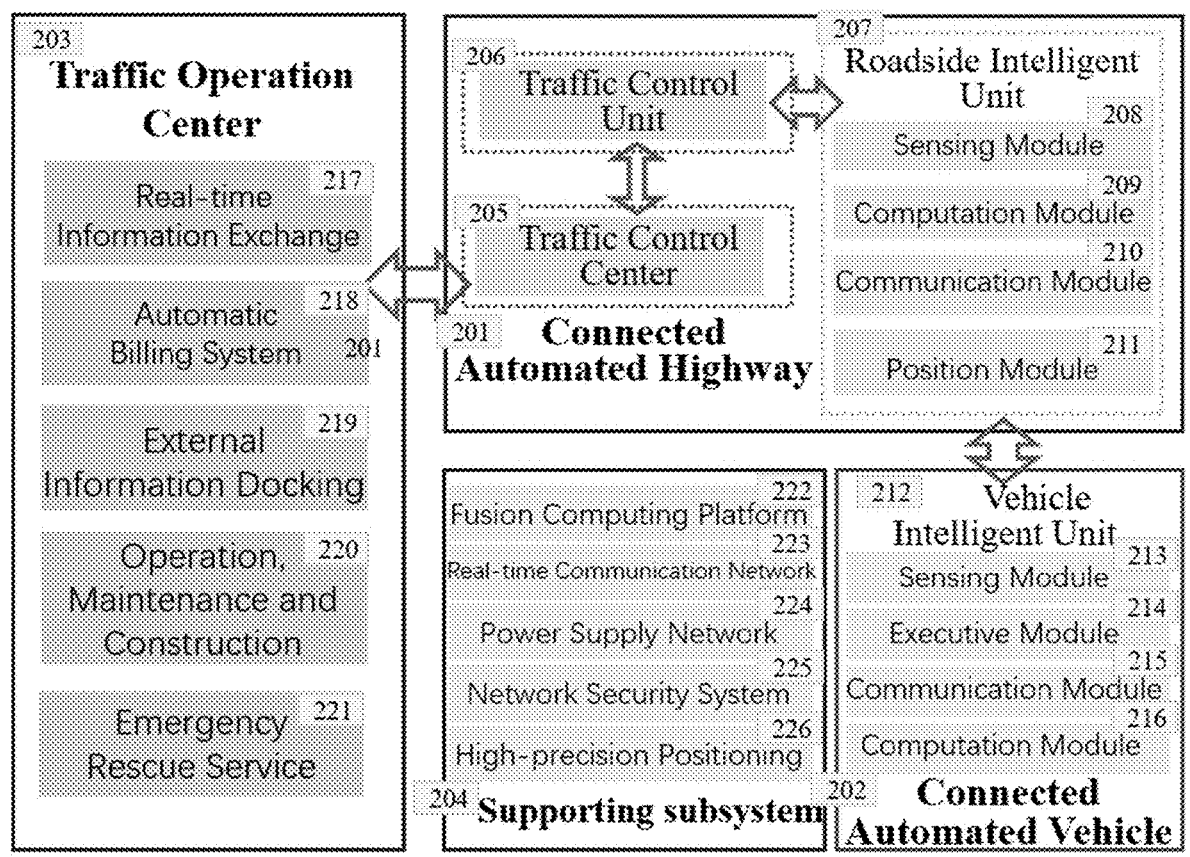
FIG. 2 shows a general architecture of a coordinated control system and method for automated driving on a Connected Automated Highway. 201: Connected Automated Highway (CAH); 202: Connected Automated Vehicle (CAV); 203: Traffic Operation Center (TOC); 204: Supporting Subsystem; 205: Traffic Control Center (TCC); 206: Traffic Control Unit (TCU); 207: Roadside Intelligent Unit (RIU); 208: Sensing Module; 209: Computation Module; 210: Communication Module; 211: Position Module; 212: Vehicle Intelligent Unit (VIU); 213: Sensing Module; 214: Executive Module; 215: Communication Module; 216: Computation Module; 217: Real-time Information Exchange; 218: Automatic Billing System; 219: External Information Docking; 220: Operation, Maintenance, and Construction; 221: Emergency Rescue Service; 222: Fusion Computing Platform; 223: Real-time Communication Network; 224: Power Supply Network; 225: Network Security System; 226: High-precision Positioning.

In some embodiments, e.g., as shown in FIG. 2, the ADS comprises functional modules to provide a coordinated control system for automated driving. In some embodiments, the ADS comprises a Connected Automated Highway (CAH) 201, a Connected Automated Vehicle (CAV) 202, a Traffic Operation Center (TOC) 203, and supporting subsystems 204. In some embodiments, the CAH subsystem 201 comprises a Traffic Control Center (TCC) 205, a Traffic Control Unit (TCU) 206, and a Roadside Intelligent Unit (RIU) 207. In some embodiments, the RIU 207 of the Connected Automated Highway 201 comprises a sensing module 208, a computation module 209, a communication module 210, and/or a position module 211. In some embodiments, the Vehicle Intelligent Unit (VIU) 212 of the Connected Automated Vehicle 202 comprises a sensing module 213, an executive module 214, a communication module 215, and a computation module 216. In some embodiments, the Traffic Operation Center 203 comprises real-time information exchange 217; automatic billing system 218; external information docking 219; operation, maintenance, and construction 220; and/or emergency rescue service 221. In some embodiments, the supporting subsystem 204 comprises a fusion computing platform 222, real-time communication 223, a power supply network 224, a network security system 225, and/or high-precision positioning 226.

Figure 3:
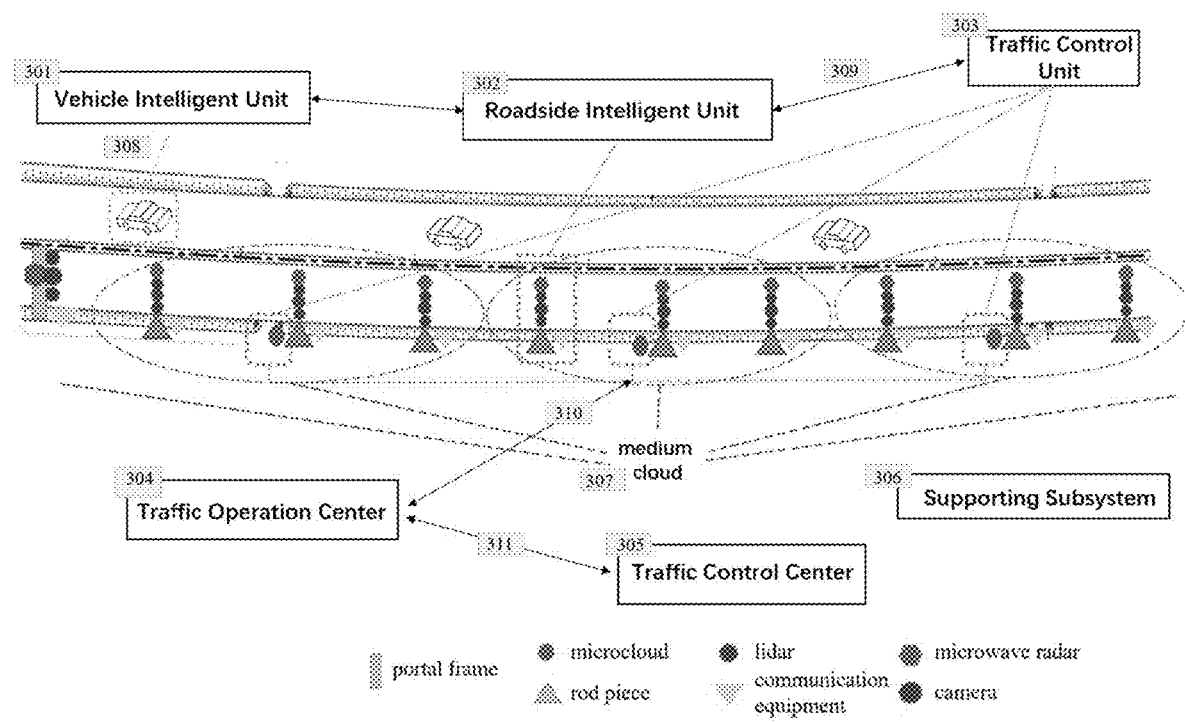
FIG. 3 shows the layout mode of the Roadside Intelligence Subsystem. 301: Vehicle Intelligent Unit; 302: Roadside Intelligent Unit; 303: Traffic Control Unit; 304: Traffic Operation Center; 305: Traffic Control Center; 306: Support System; 307: Medium Cloud; 308: Data transmission between VIU and RIU; 309: Data transmission between RIU and TCU; 310: Data transmission between TOC and TCU (microcloud); 311: Data transmission between TOC and TCC.

In some embodiments, the technology comprises an Intelligent Roadside Infrastructure System (IRIS). In some embodiments, an IRIS has a design and layout as shown in FIG. 3. For example, in some embodiments, an IRIS comprises a Roadside Intelligent Unit 302, a Traffic Control Unit 303, and/or a Traffic Control Center 305. In some embodiments, the TCU 303 is built on a micro-cloud. In some embodiments, the TCC 305 is built on a medium-cloud 307. The micro-cloud is a fundamental node of the medium-cloud, which provides the high density, performance, efficiency, and cost effectiveness to address system demands for server deployments. In some embodiments, the IRIS is responsible for road traffic information sensing, computation, and localization functions. In some embodiments, the TOC 304 provides traffic operations and management services for IRIS (e.g., service charges, emergency response, and external system information). In some embodiments, the supporting subsystem 306 provides, e.g., cloud platform, high-precision positioning, high-precision map, network communication, and/or power for the IRIS system. In some embodiments, data transfer 308 occurs between VIU 301 and RIU 302. In some embodiments, data transfer 309 occurs between RIU 302 and TCU 303. In some embodiments, data transfer 310 occurs between TOC 304 and TCU 303 (e.g., the microcloud). In some embodiments, data transfer 311 occurs between TOC 304 and TCC 305.

Figure 4:
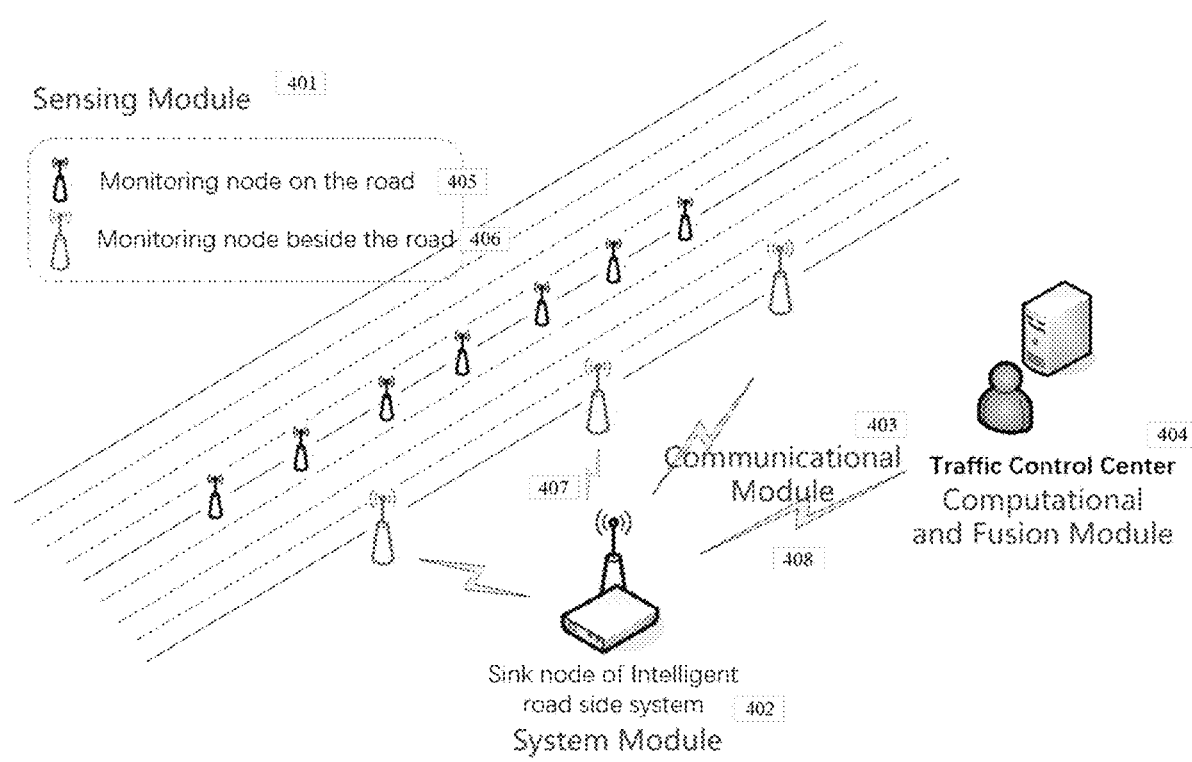
FIG. 4 shows the architecture of IRIS. 401: Sensing Module; 402: System Module; 403: Communication Module; 404: Computation and Fusion Module; 405: Monitoring node on the road; 406: Monitoring node beside the road; 407: Communication between monitoring node and system module; 408: Communication between Traffic Control Center and system module.

In some embodiments, an IRIS has an architecture as shown in FIG. 4. For example, in some embodiments, an IRIS comprises a sensing module 401, a system module 402, a communication module 403, and a computation and fusion module 404. In some embodiments, the computation and fusion module 404 is located in the Traffic Control Center (TCC). In some embodiments, the sensing module 401 comprises a monitoring node 405 on the road. In some embodiments, the sensing module 401 comprises a monitoring node 406 beside the road. In some embodiments, communication 407 occurs between the monitoring node 407 and system module 402. In some embodiments, communication 408 occurs between the Traffic Control Center and the system module 402. In some embodiments, the communication module 403 is configured to provide communication between the IRIS and CAV and/or to provide data exchange between each module.

Figure 5:
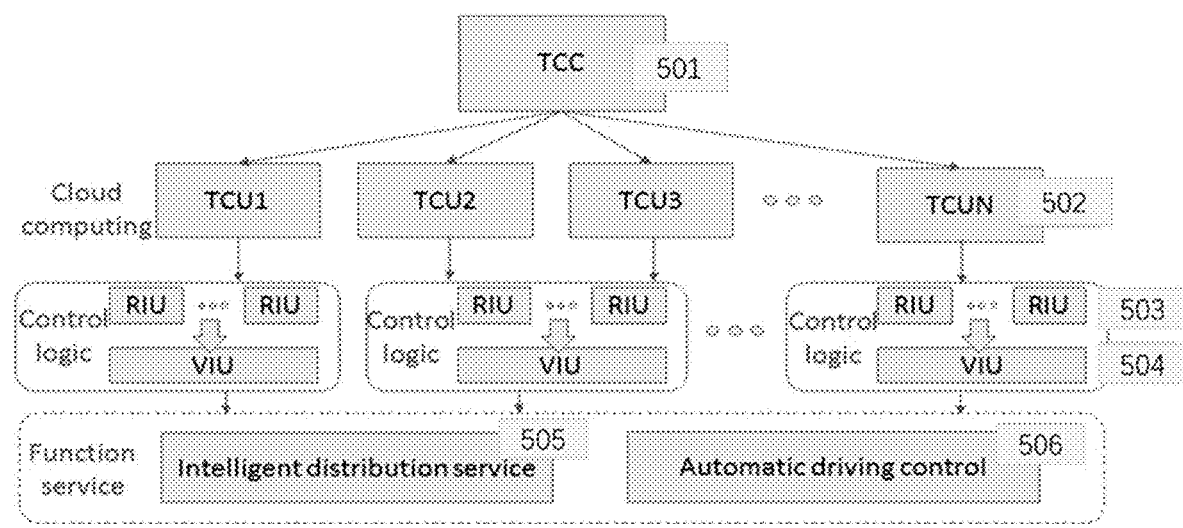
FIG. 5 shows the system architecture and control logic of the Traffic Control Center. 501: TCC; 502: TCU; 503: RIU; 504: VIU; 505: Intelligence distribution service; 506: Automated driving control.

In some embodiments, e.g., as shown in FIG. 5, the Traffic Control Center 501 has a system architecture and control logic. In some embodiments, the technology comprises multiple Traffic Control Units 502 (e.g., TCU1, TCU2, TCU3, . . . TCUN). In some embodiments, the Traffic Control Center 501 and the Traffic Control Units 502 receive sensing information transmitted by the Roadside Intelligent Unit 503 and Vehicle Intelligent Unit 504 and, in some embodiments, the Traffic Control Center 501 and the Traffic Control Units 502 subsequently process and/or analyze the sensing information. In some embodiments, the Traffic Control Center 501 targets instructions to particular layers and/or sends instructions through the layers to provide Automated driving control 506 and/or Intelligent distribution of services 505. For example, in some embodiments, the Traffic Control Center 501 sends instructions through the hierarchical layers to CAV, e.g., from the Traffic Control Center 501, through the Traffic Control Unit 502 to the Roadside Intelligent Unit 503, and finally to the Vehicle Intelligent Unit 504.

Figure 6:
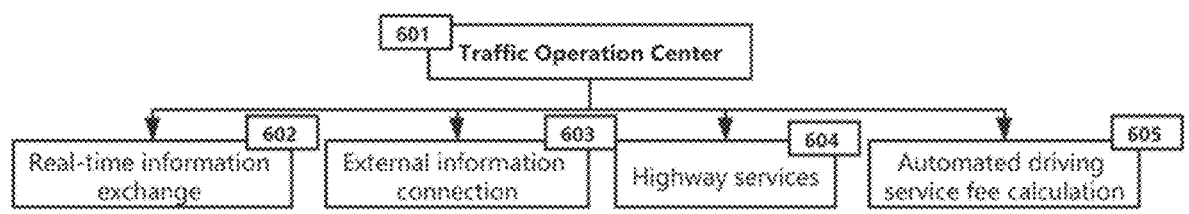
FIG. 6 shows the functional architecture of the Traffic Operation Center. 601: TOC; 602: Real-time information exchange; 603: External information connection; 604: Highway services; 605: Automated driving service fee calculation.

In some embodiments, e.g., as shown in FIG. 6, the Traffic Operation Center 601 has a functional architecture, e.g., comprising multiple subsystems configured to provide functions. In some embodiments, the Traffic Operation Center 601 has a functional architecture, e.g., configured to provide multiple functions. For example, in some embodiments, the Traffic Operation Center 601 is configured to provide and/or comprises functional subsystems configured to provide, e.g., real-time information exchange 602, external information connection 603, highway services 604, and/or automated driving service fee calculation 605. In some embodiments, the Traffic Operation Center 601 comprises a real-time information exchange 602 that shares information with the Traffic Control Center in real-time. In some embodiments, the Traffic Operation Center 601 comprises an external information connection 603 that receives information (e.g., provided by external publishing sources (e.g., including but not limited to meteorological stations and broadcasting stations)) and transmits driving environment-related information to vehicles and IRIS. In some embodiments, the Traffic Operation Center 601 comprises a highway services component 604 configured to provide highway operation services, maintenance management services, construction services, and rescue services. In some embodiments, the Traffic Operation Center 601 comprises an automated driving service fee calculation component 605 configured to calculate the fee to be paid by users of the automated driving service according to the amount a user uses the automated driving service and other fee charging rules.

Figure 7:
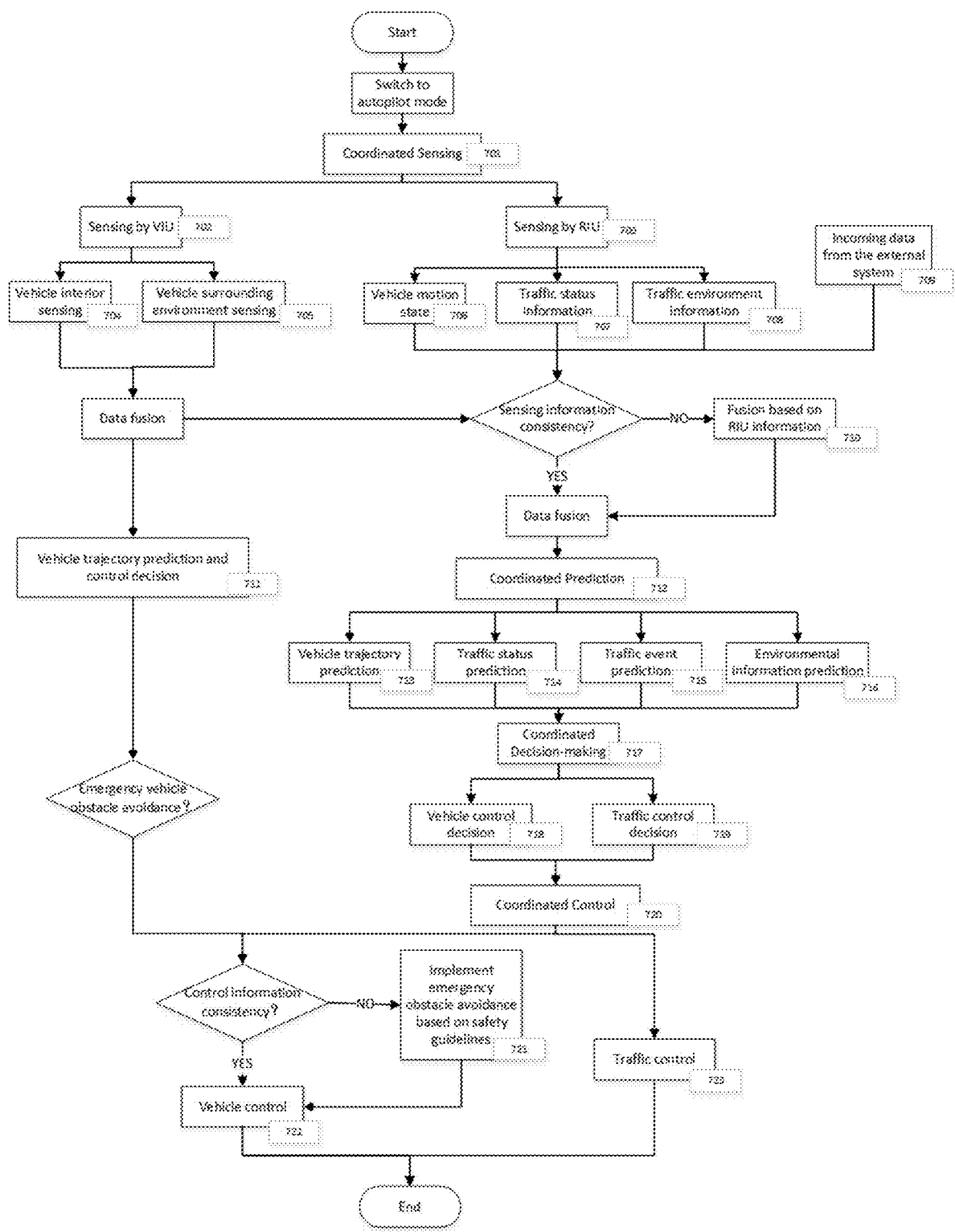
FIG. 7 shows data flow of a coordinated control method for automated driving, supported by the intelligent roadside system. 701: Coordinated Sensing; 702: Sensing by VIU; 703: Sensing by RIU; 704: Vehicle interior sensing; 705: Vehicle surrounding environment sensing; 706: Vehicle motion state; 707: Traffic status information; 708: Traffic environment information; 709: Incoming data from the external system; 710: Fusion based on RIU information; 711: Vehicle trajectory prediction and control decision; 712: Coordinated Prediction; 713: Vehicle trajectory prediction; 714: Traffic status prediction; 715: Traffic event prediction; 716: Environmental information prediction; 717: Coordinated Decision-making; 718: Vehicle control decision; 719: Traffic control decision; 720: Coordinated Control; 721: Emergency obstacle avoidance based on safety guidelines; 722: Vehicle control; 723: Traffic control.

In some embodiments, e.g., as shown in FIG. 7, the technology provides automated driving coordinated control. In some embodiments, the automated driving coordinated control is supported by the intelligent network road system and comprises data flow within the intelligent network road system. For example, in some embodiments, the system provides automated driving control for a CAV in autopilot mode using coordinated sensing 701. In some embodiments, coordinated sensing 701 coordinates sensing by VIU 702 and sensing by RIU 703. In some embodiments, the VIU 702 performs data fusion 710 of vehicle interior sensing information 704 and vehicle surrounding environment sensing information 705. In some embodiments, the RIU 703 senses vehicle motion state 706, traffic status information 707, and traffic environment information 708. In some embodiments, data from VIU, RIU, and incoming data from the external system 709 are sent to the TCC (e.g., via the RIU). Then, in some embodiments, the coordinated sensing data is fused by the TCC. In some embodiments, if an inconsistency is detected in the data, the system performs data fusion 711 based on RIU data.

In some embodiments, coordinated sensing 701 provides fused sensing data and information to coordinated prediction. In some embodiments, coordinated sensing 701 ends and coordinated prediction 712 begins. In some embodiments, coordinated sensing 712 comprises vehicle trajectory prediction 713, traffic status prediction 714, traffic event prediction 715, and/or environmental information prediction 716. In some embodiments, the result of the coordinated prediction 712 is provided to coordinated decision-making 717. In some embodiments, coordinated decision-making comprises making vehicle control decisions 718 and/or traffic control decisions 719.

In some embodiments, coordinated prediction and decision-making provides predictions and decisions to coordinated control 720. In some embodiments, the result of coordinated decision-making 717 is divided into two parts: a first part (e.g., traffic control 723) and a second part. In some embodiments, the first part (e.g., traffic control 723) is used by the CAH. In some embodiments, the second part is used by the CAV. In some embodiments, the VIU fuses TCC control information and control information from the vehicle trajectory prediction and control decision 711. In some embodiments, the VIU implements (e.g., provides control instructions to a CAV) emergency obstacle avoidance based on safety guidelines 721. Accordingly, as shown in FIG. 7, the technology provides systems and methods for vehicle control 722 and traffic control 723.

Figure 8:
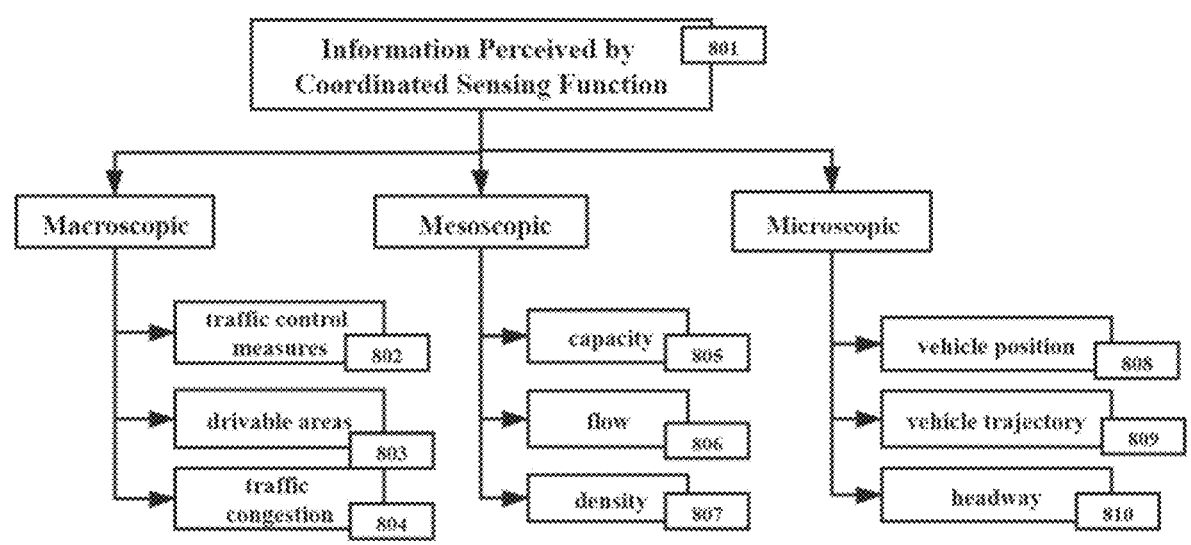
FIG. 8 shows the information perceived by coordinated sensing functions. 801: Information perceived by coordinated sensing function; 802: Traffic control measures; 803: Drivable areas; 804: Traffic congestion; 805: Vehicle and/or traffic capacity; 806: Traffic Flow; 807: Vehicle Density; 808: Vehicle position; 809: Vehicle trajectory; 810: Headway.

In some embodiments, e.g., as shown in FIG. 8, the technology provides coordinated sensing functions. In some embodiments, the coordinated sensing functions record information at macroscopic, mesoscopic, and/or microscopic levels. For instance, in some embodiments, macroscopic information includes traffic control measures 802, drivable areas 803, and/or traffic congestion 804; mesoscopic information includes traffic capacity 805, traffic flow 806, and/or traffic density 807; and/or microscopic information includes vehicle position 808, vehicle trajectory 809, and/or vehicle headway 810.

Figure 9:
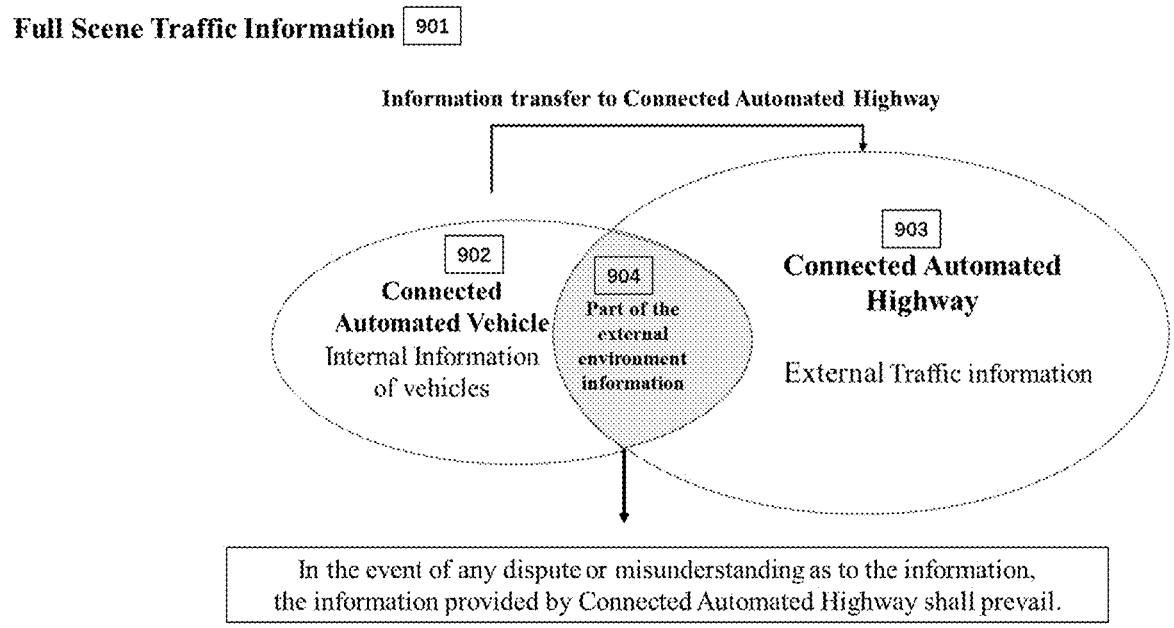
FIG. 9 shows the allocation of sensing functions between the Connected Automated Vehicle Subsystem (e.g., CAV of a CAV Subsystem) and the Connected Automated Highway Subsystem (e.g., a CAH of a CAH Subsystem). 901: Full scene information perception; 902: Information perceived by Connected Automated Vehicle Subsystem (e.g., by one or more CAV of a CAV Subsystem and/or by a CAV Subsystem); 903: Information perceived by Connected Automated Highway Subsystem (e.g., by a CAH of a CAH Subsystem and/or by a CAH Subsystem).

In some embodiments, e.g., as shown in FIG. 9, the technology allocates the coordinated sensing function between Connected Automated Vehicles (e.g., the CAV subsystem comprising CAV) and the Connected Automated Highway (e.g., the CAH subsystem, e.g., comprising IRIS components). In some embodiments, the CAV sense traffic information (e.g., a portion of the traffic information) and the CAH senses traffic information (e.g., a portion of the traffic information). For example, in some embodiments, the CAV sense vehicle internal parameter information 902 and a portion of vehicle external environment information 904; and the CAH subsystem senses vehicle external environment information 903, which includes the portion of the vehicle external environment information 904 sensed by the CAV. A portion of the external information 904 is simultaneously sensed by CAV subsystem and CAH subsystem. In some embodiments, the CAH subsystem senses more vehicle external environment information 903 than the CAV subsystem. In some embodiments, the information sensed by the CAV is transmitted to the CAH subsystem to provide full-scene ("panoramic") traffic information 901. In some embodiments, the technology provides that information sensed by the CAH Subsystem prevails when the system determines that information sensed by the CAV subsystem and the CAH subsystem is inconsistent.

Figure 10:
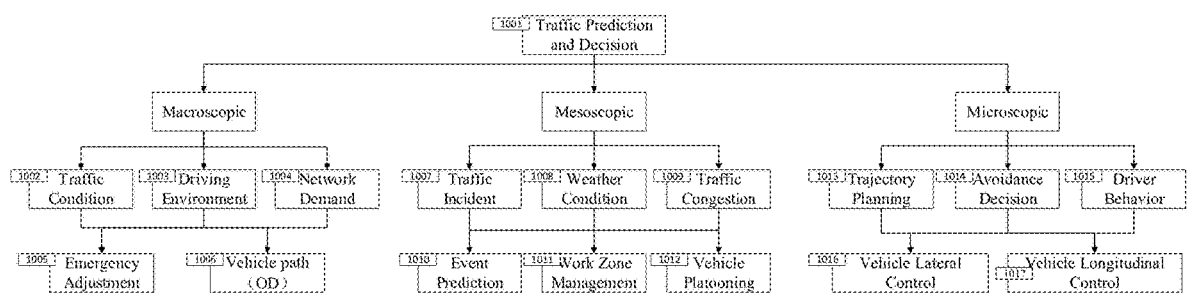
FIG. 10 shows the content and allocation implementation of traffic prediction and decision information. 1001: Traffic prediction and decision; 1002: Traffic condition; 1003: Driving Environment; 1004: Network demand; 1005: Emergency Adjustment; 1006: Vehicle path (origin and destination (OD)); 1007: Traffic incident; 1008: Weather Condition; 1009: Traffic Congestion; 1010: Event Prediction; 1011: Work Zone Management; 1012: Vehicle Platooning; 1013: Trajectory Planning; 1014: Avoidance Decision; 1015: Driver Behavior; 1016: Vehicle Lateral Control; 1017: Vehicle Longitudinal Control.

In some embodiments, e.g., as shown in FIG. 10, the technology provides collaborative traffic prediction and decision-making 1001. In some embodiments, the collaborative traffic prediction and decision-making 1001 comprises allocation of information and functions among the CAV subsystem and the CAH subsystem to provide predicted status information describing a future state of the system (e.g., provide predicted information) and/or to make decisions using the predicted status of the system. In some embodiments, collaborative prediction and decision-making provides prediction and decision-making information on a macroscopic level, mesoscopic level, and/or microscopic level. For example, macroscopic prediction includes providing information relating to traffic conditions 1002, driving environment 1003, and/or network demand 1004; and macroscopic decision-making includes making decisions to manage traffic in an emergency (emergency adjustment 1005) and/or to manage vehicle paths 1006 (e.g., managing vehicle origin and/or destination). Mesoscopic prediction includes predicting a traffic incident 1007, weather conditions 1008, and/or traffic congestion 1019; and mesoscopic decision-making includes predicting and/or managing traffic for a special event 1010, managing a work zone 1011, and/or managing vehicle platooning 1012. Microscopic prediction includes predicting a vehicle trajectory (trajectory planning 1013) and/or predicting driver behavior 1015; microscopic decision-making includes making avoidance decisions 1014, e.g., making decisions relating to vehicle lateral control 1016 and/or decisions relating to vehicle longitudinal control 1017. In some embodiments, macroscopic and mesoscopic prediction and decision-making are provided by VIU. In some embodiments, microscopic prediction and decision-making relating to trajectory planning 1013, avoidance decisions 1014, and driver behavior 1015 are provided by TCC and microscopic decision-making relating to vehicle lateral control 1016 and vehicle longitudinal control 1017 are assigned to VIU by TCC.

Figure 11:
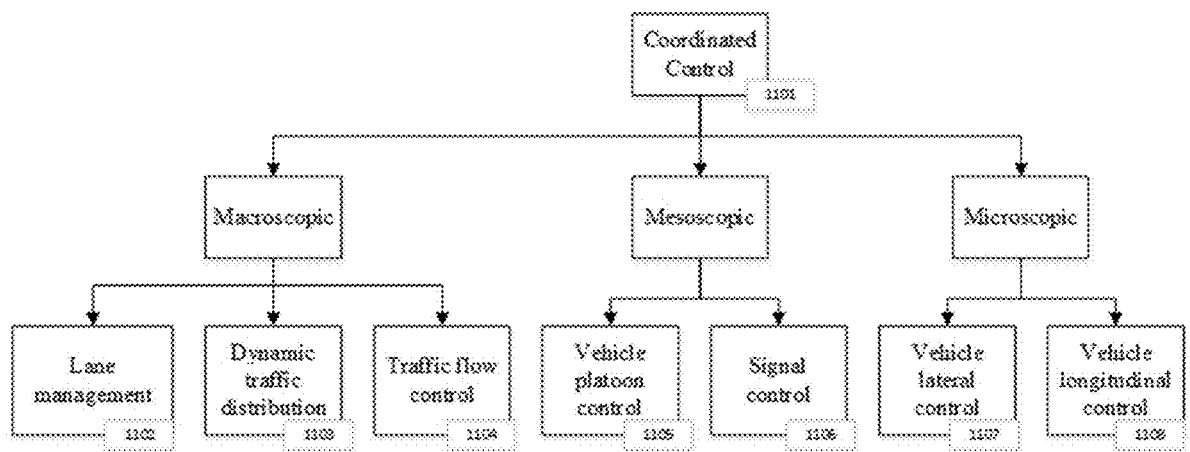
FIG. 11 shows an exemplary structure of a coordinated control method. 1101: Coordinated Control; 1102: Lane management; 1103: Dynamic traffic distribution; 1104: Traffic flow control; 1105: Vehicle platoon control; 1106: Signal control; 1107: Vehicle lateral control; 1108: Vehicle longitudinal control.

In some embodiments, e.g., as shown in FIG. 11, the technology provides coordinated control of CAV. In some embodiments, the technology comprises a system configured to provide coordinated control of CAV. In some embodiments, an automated driving coordinated control system 1101 (e.g., in some embodiments supported by the intelligent network road system) provides coordinated control at a macroscopic level, mesoscopic level, and/or microscopic level. For example, in some embodiments, the macroscopic level includes lane management 1102, dynamic traffic distribution 1103, and/or traffic flow control 1104. In some embodiments, the mesoscopic level includes vehicle platoon control 1105 and/or signal control 1106. In some embodiments, the microscopic level includes vehicle longitudinal control 1107 and/or vehicle lateral control 1108.

Figure 12:
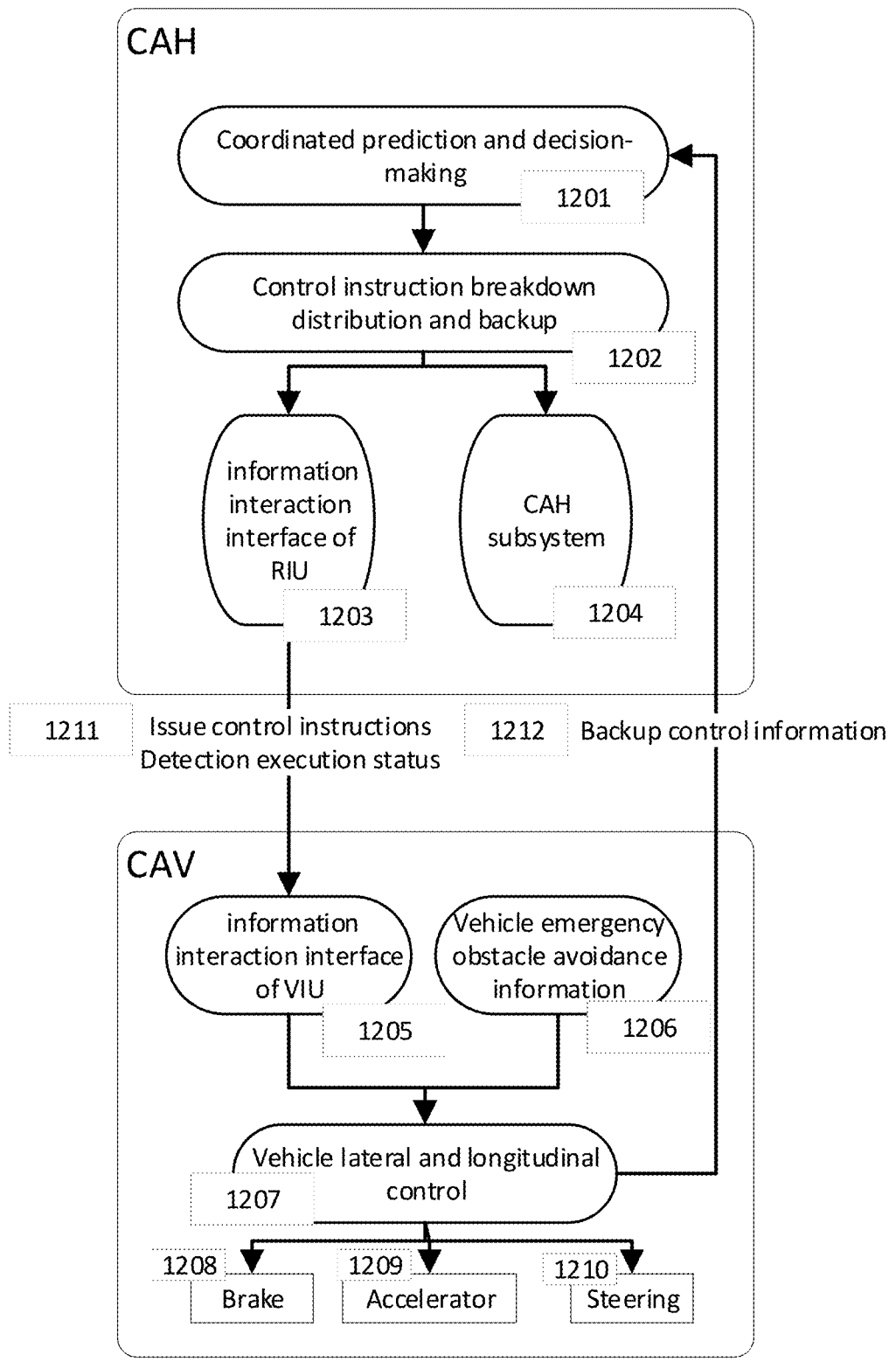
FIG. 12 shows an exemplary coordinated control method. 1201: Coordinated prediction and decision-making; 1202: Control instruction breakdown distribution and backup; 1203: information interaction interface of RIU; 1204: CAH subsystem; 1205: information interaction interface of VIU; 1206: Vehicle emergency obstacle avoidance information; 1207: Vehicle lateral and longitudinal control; 1208: Brake; 1209: Accelerator; 1210: Steering; 1211: Issue control instructions and detection execution status; 1212: Backup control information.

In some embodiments, e.g., as shown in FIG. 12, the technology provides a method for the coordinated control of CAV. For example, when the TCC of the CAH obtains coordinated prediction and decision-making information 1201, control instructions are decomposed and distributed 1202 to the CAH and CAV according to system objectives and goals. After receiving instructions from the TCC, the CAV Subsystem 1204 implements traffic management and control measures (e.g., manages traffic according to a speed limit, manages lane control, manages traffic signal control, etc.), e.g., by issuing control instructions 1211 (e.g., detailed and time-sensitive control instructions for individual vehicles) to roadside infrastructure (e.g., through the information interaction interface of an RIU). The roadside infrastructure (e.g., RIU) sends information and control instructions (e.g., detailed and time-sensitive control instructions for individual vehicles) to a vehicle (e.g., to a CAV (e.g., to a VIU)). After receiving the control instructions and detecting execution status through the information interaction interface of the RIU 1203 and the information interaction interface of VIU 1205, the VIU fuses the data from the CAH and the vehicle emergency obstacle avoidance information 1206. Then, the system provides vehicle lateral and longitudinal control 1207 to the CAV, (e.g., to control brakes 1208, accelerator 1209, and/or steering 1210). In some embodiments, the relevant control instructions and execution results are backed up 1212, e.g., locally and in the TOC.

Figure 13:
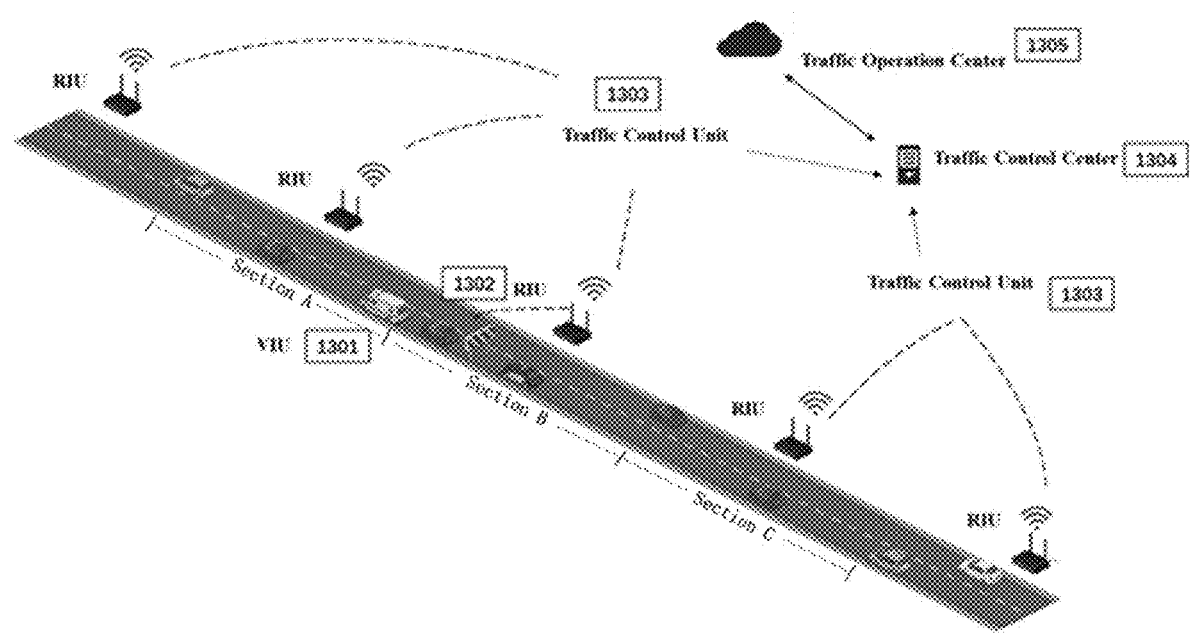
FIG. 13 is an information flow chart of a coordinated control system and method under the traffic accident condition. 1301: VIU; 1302: RIU; 1303: TCU; 1304: TCC; 1305: TOC.

In some embodiments, e.g., as shown in FIG. 13, the technology provides coordinated control of vehicles to address a traffic accident. For example, in some embodiments, the system comprises a data flow when a traffic accident occurs on a road of the system. When an accident occurs in a CAV, the VIU 1301 on the vehicle transmits accident information to the TCC 1304 via the TCU 1303. Meanwhile, the RIU 1302 of the IRIS senses the accident information through the TCU 1303 and transmits the accident information to the TCC 1304. The TCC 1304 transmits the collected information to the TOC 1305.

Figure 14:
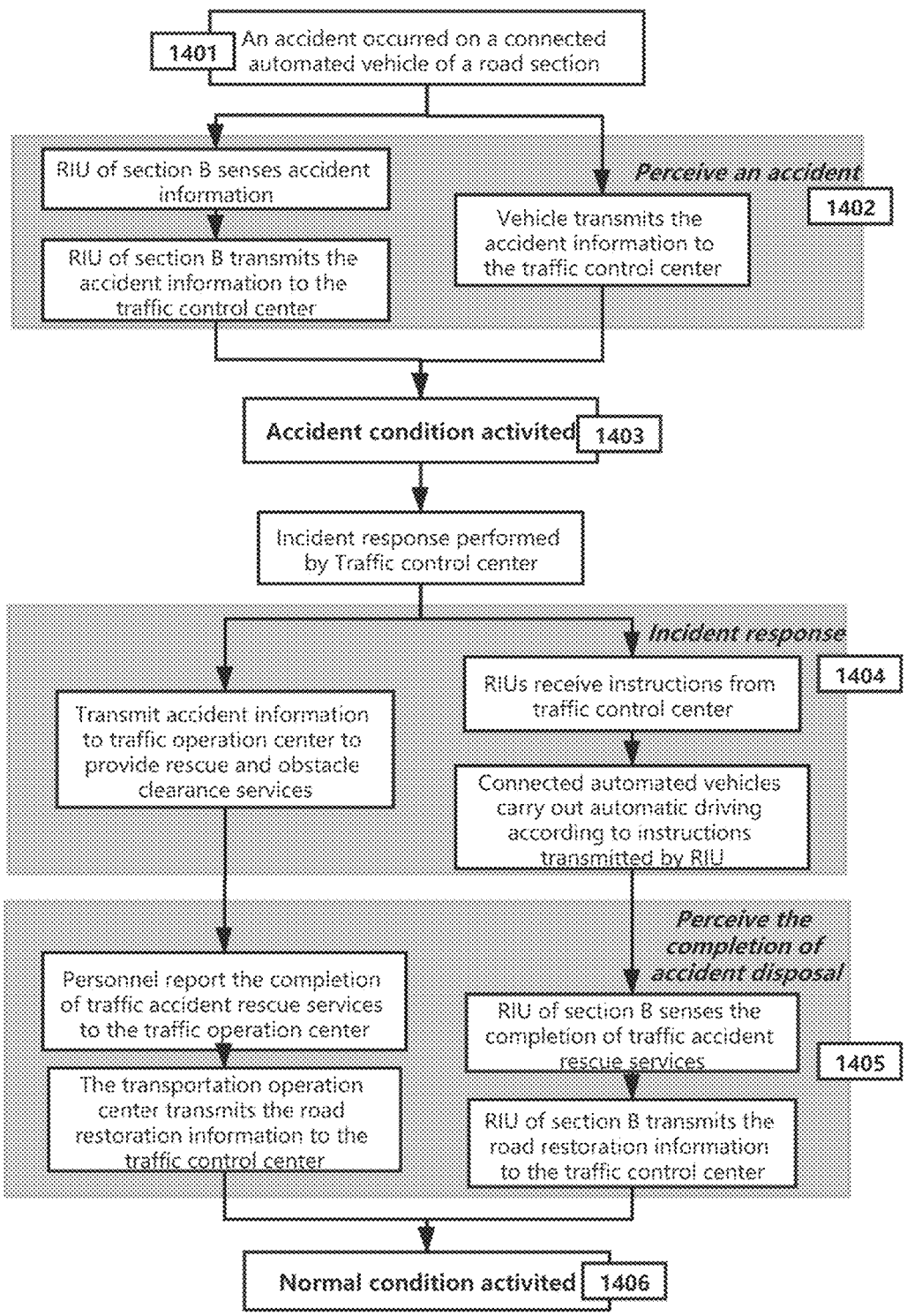
FIG. 14 is a process flow chart for a coordinated control system and method under a traffic accident condition. 1401: Occurrence of an accident on a road section; 1402: System Perception of accident; 1403: Activation of accident condition; 1404: System response of accident; 1405: System Perception of the completion of accident disposal; 1406: Activation of normal condition.

In some embodiments, e.g., as shown in FIG. 14, the technology provides a response process when a traffic accident occurs on a road of the system, e.g., a road section such as Section B shown in FIG. 13. For example, when an accident of a CAV occurs on a road section 1401, the technology comprises perceiving the accident 1402. In some embodiments, perceiving the accident comprises perceiving the accident using intelligent road infrastructure and, in some embodiments, perceiving the accident comprises perceiving the accident using vehicle intelligent components, functions, and/or capabilities. Then, methods comprise activating an accident condition 1403 and responding to the accident 1404. In some embodiments, responding to the accident comprises responding to the accident using intelligent road infrastructure, and in some embodiments, responding to the accident comprises responding to the accident using vehicle intelligent components, functions, and/or capabilities. Lastly, methods comprise perceiving resolution of the accident situation 1405 and activating the normal (non-accident) condition 1406.

Accordingly, as described herein the technology provides systems and methods configured to provide coordinated control for an ADS. In an exemplary system, the technology provides a system operating at a specified intelligence level S for CAV operating at a specified intelligence level V on a CAH operating at a specified intelligence level I. An exemplary situation is when the CAH intelligence level I is higher than the CAV intelligence level V. For instance, exemplary systems provide control of CAV where intelligence level V is lower than level 2 (V2) (e.g., level V1.5, referring to a vehicle with limited intelligence and automation functions).

An exemplary system comprises a Connected Automated Highway (CAH) subsystem; a Connected Automated Vehicle (CAV) subsystem; a Traffic Operation Center (TOC); and supporting subsystems. The CAH comprises an IRIS (e.g., comprising a network of multiple Roadside Intelligent Units (RIUs), a Traffic Control Center (TCC), and Traffic Control Units (TCU)), roads (e.g., highways), and other infrastructure.

The CAH subsystem comprises an RIU (e.g., capable of sensing and fusing traffic state information, uploading traffic state information, and issuing control instructions). The RIU comprises a coordinated sensing module, a computing and fusion module, a communication module, and a position module. The CAH subsystem further comprise a TCU (e.g., which is capable of receiving and processing information by interacting with multiple TCUs, issuing instructions received from a TCC, integrating local and global control decisions, and receiving decision instructions from a TCC). The TCU comprises a data-exchange and control module, a communication module, a service management module, an application module, and an interactive interface. The CAH subsystem further comprises a TCC (e.g., which is capable of controlling hardware devices and functional service interaction of the IRIS system, supporting intelligence distribution at the system level, and executing automated driving control). The TCC manages connectivity and data exchange and comprises a data service module, a transmission module, a service management module, a management application module, and a user interaction interface.

In an exemplary system, the CAV (e.g., via a VIU) interacts with the CAH subsystem and cooperates with the IRIS subsystem to achieve coordinated control of the CAV. The VIU comprises limited automated driving functions (e.g., basic sensing, computing, communication, and execution) and is supported by an onboard sensing module; an onboard computing module; an onboard execution module; and an onboard communication module.

In an exemplary system, the TOC provides real-time information exchange with the TCC; automated driving service fee calculation; collection and distribution of external information provided by source agencies (e.g., including but not limited to meteorological stations, broadcasting stations, government agencies, etc.) to publish driving environment-related information to vehicles and IRIS; and roadway operations, maintenance management, construction services, and rescue services.

Exemplary systems are configured to provide Automated Driving Coordinated Control, e.g., methods for coordinated sensing; methods for coordinated prediction and decision-making; and/or methods for coordinated control. Exemplary systems comprise modules configured to perform a coordinated sensing method, e.g., modules to collect traffic state and environmental data to realize road alignment estimation; dynamic and static traffic state and obstacle detection and recognition; vehicle state acquisition and motion compensation; traffic sign, traffic lights, and other traffic infrastructure detection; vehicle localization (e.g., high-precision map based and mapless localization); modules to provide environment sensing and information collection at the microscopic, mesoscopic, and macroscopic level; and modules to cooperate with the IRIS and the connected automated vehicles. Coordinated sensing detects macroscopic information, including traffic control measures, traffic congestion conditions, and drivable areas; mesoscopic information, including traffic capacity, traffic density, and traffic flow; and microscopic information, including surrounding vehicle position, vehicle trajectory, and headway. The RIU provides global traffic information, e.g., external traffic status and environmental data and a portion of internal parameters of CAVs. The VIU of the CAV provides local traffic information, e.g., internal parameters and driver status of the CAVs and a portion of external traffic environments information. The information sensed by the VIU is forwarded to the CAV as the basis for detecting emergency issues (e.g., to implement emergency control (e.g., braking) procedures for a vehicle with limited intelligence (e.g., a V1.5 vehicle or a V1.5 CAV system)). The information sensed by the VIU and the RIU is transmitted to the TCU (e.g., through the IRIS subsystem) and then transmitted from the TCU to the TCC for information integration. Information integration is a process where information from VIU and RIU is fused to form a complete (or substantially and/or essentially complete) traffic scene information. The information sensed by the RIU is used to calibrate the information perceived by VIU and the external traffic information perceived by the VIU sensors is used as redundant safety information. When the VIU sensing function fails, the RIU can provide information support.

Coordinated prediction and decision-making by IRIS and CAV provides prediction and analysis of traffic state and behavior, including but not limited to traffic state prediction and decision, driving behavior prediction, and decision-making; and forecasting and decision-making at the microscopic, mesoscopic, and macroscopic levels of the traffic environment. Prediction and traffic decision at the macroscopic level includes traffic state prediction; network demand prediction; driving environment prediction; and traffic behavior decisions such as vehicle platoon formation and vehicle path trajectory planning Based on the comparison of the traffic flow parameter results by sensing and prediction, a control and management decision is made. Prediction and traffic decision at the mesoscopic level include special event prediction; weather forecast notification; formation prediction; congestion prediction; and predicting and decision-making for vehicle lane changes and car-following behavior in areas such as special event prompt areas, work areas, speed bumps, and ramps. Prediction and traffic decision at the microscopic level includes driver behavior prediction; real-time vehicle trajectory prediction; intent recognition and motion prediction of surrounding vehicles; longitudinal control, speed tracking, distance maintenance, and other functions to ensure the smoothness of automated driving lanes and safe and energy-saving driving; lateral control, including lane-keeping and lane-changing; and decision-making of vehicle lateral and longitudinal control parameters.

Prediction and traffic decision functions are mainly based within the TCC of the CAH subsystem and use multi-source sensing of the IRIS subsystem and VIUs and multi-mode threshold conditions such as system safety and traffic efficiency. The TCC is mainly responsible for the macroscopic and mesoscopic prediction and decision making, e.g., providing road network traffic status to CAVs for reasonable planning and prediction of vehicle driving environment. The macroscopic-level functionality of TCC includes traffic road network scheduling, trip guidance, emergency rescue, event notification, and other service functions; mesoscopic-level functionality of TCC includes event prediction, congestion determination, and weather prediction. The TCC guides the CAVs to carry out control commands and realizes the strategy decisions of CAV platoon control.

The VIU mainly performs partial microscopic-level prediction, e.g., predicting vehicle trajectory according to the basic perception functions provided by a vehicle and discriminating the movement behavior of surrounding vehicles. At any intelligence level, the CAV subsystem can realize the emergency braking and safe braking decision based on a vehicle's own sensing and prediction results combined with the vehicle's safe obstacle avoidance functions. When the intelligence level of CAV increases, the CAVs further realize the vehicle operation decision-making according to the vehicle sensing and prediction results and further completes decision-making for the lateral and longitudinal control parameters of the CAV.

The TCC and the VIU functionalities are coordinated to make partial traffic micro-prediction. According to the macroscopic and microscopic traffic characteristics after traffic data fusion, the CAV driving behavior and the CAV lateral and longitudinal control are predicted and analyzed. Based on the safety strategies, road safety and traffic flow smoothness are managed (e.g., optimized) and decision-making for vehicle following and lane changing behavior parameters at the microscopic level is realized.

At the level of safety assurance, the IRIS subsystem and CAV implement intersection prediction and control. If one of these two subsystems makes safety obstacle avoidance prediction and decision-making information, the system uses safety prediction information to make safety behavior decisions.

Coordinated control of CAH and CAV comprises the dynamic distribution and active control of road traffic flow by the CAH subsystem. Control instructions are formed to provide lateral and longitudinal control of CAVs through the CAH subsystem, and relevant execution results are detected and backed up by the system. The CAH subsystem coordinates with the CAVs and implements corresponding safety control strategies from the road section and road network level to manage (e.g., optimize) safety in abnormal conditions. Coordinated control assigns control functions to CAH subsystem and CAV subsystem to enhance system accuracy and safety for automated driving of CAV. Macroscopic coordinated control includes traffic flow control, dynamic traffic distribution, lane management, and system resource allocation. Mesoscopic coordinated control comprises vehicle platoon control and intelligent roadside facilities control. Microscopic coordinated control comprises vehicle longitudinal and lateral control, wherein the CAV receives instructions from the IRIS control module and is responsible for adjusting the vehicle speed, acceleration, and steering angle. A process of coordinated control for CAV comprises steps during which control instructions at the macroscopic level, the mesoscopic level, and the microscopic level are decomposed and distributed by traffic control centers; traffic control and management, such as variable speed limit, variable lane, signal control, are implemented through RIUs; and the status of the vehicle executing the control instructions is detected by RIUs and transferred to the control center, and in case of abnormal situations, RIUs alert the vehicle, report to the control center, and provide early warning to the surrounding vehicles simultaneously. These methods are used for the coordinated control of CAH and CAV during which the VIU of the intelligent connected vehicle is responsible for receiving the control instructions sent by the RIU, and completing the relevant longitudinal and lateral control instructions in combination with the CAV control system for the vehicle throttle, brake, steering angle; and when the vehicle detects by itself or receives an emergency situation alert issued by the system, emergency obstacle avoidance actions such as braking are taken according to the emergency obstacle avoidance module of the vehicle, and relevant control information is reported to the traffic control center at the same time.

Automated Driving Systems (ADS)

In some embodiments, the technology provides coordinated control of traffic and vehicles for a vehicle operations and control system (e.g., an automated driving system (ADS) and technologies as described herein). In some embodiments, the ADS comprises one or more of a roadside intelligent unit (RIU) network; a Traffic Control Unit (TCU), a Traffic Control Center (TCC); a TCU/TCC network; a vehicle intelligent unit (VIU) (e.g., a vehicle comprising a VIU); and/or a Traffic Operations Center (TOC). In some embodiments, the system comprises multiple kinds of sensors and computation devices on CAV and infrastructure (e.g., roadside infrastructure) and is configured to integrate sensing, prediction, planning, and control for automated driving of CAV (e.g., as described in U.S. Pat. App. Ser. No. 63/042,620, incorporated herein by reference.

In some embodiments, the ADS is provided as a connected and automated vehicle highway (CAVH) system, e.g., comprising one or more components of an intelligent road infrastructure system (see, e.g., U.S. patent application Ser. No. 16/267,836 and U.S. patent application Ser. No. 10,380,886, each of which is incorporated herein by reference). In some embodiments, the ADS is provided as or supports a distributed driving system (DDS), intelligent roadside toolbox (IRT), and/or device allocation system (DAS) (see, e.g., U.S. Pat. App. Ser. Nos. 62/894,703; 63/004,551; and 63/004,564, each of which is incorporated herein by reference). In some embodiments, the term "roadside intelligent unit" and its abbreviation "RIU" are used to refer to the components named a "roadside unit" and its abbreviation "RSU", respectively, as described for the CAVH technology in, e.g., U.S. patent application Ser. No. 16/267,836 and U.S. Pat. No. 10,380,886, each of which is incorporated herein by reference. In some embodiments, the term "vehicle intelligent unit" and its abbreviation "VIU" are used to refer to the components named an "onboard unit" and its abbreviation "OBU", respectively, as described for the CAVH technology in, e.g., U.S. patent application Ser. No. 16/267,836 and U.S. Pat. No. 10,380,886, each of which is incorporated herein by reference. In some embodiments, the term "vehicle intelligent unit" and its abbreviation "VIU" are used to refer to the components named an "onboard intelligent unit" and its abbreviation "OIU", respectively, as described in U.S. Pat. App. Ser. No. 63/042,620, incorporated herein by reference.

In some embodiments, the technology provides a system (e.g., a vehicle operations and control system comprising a RIU and/or an RIU network; a TCU/TCC network; a vehicle comprising an vehicle intelligent unit; a TOC; and/or a cloud-based platform configured to provide information and computing services (see, e.g., U.S. patent application Ser. No. 16/454,268, incorporated herein by reference)) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RIU network comprises an RIU subsystem. In some embodiments, the RIU subsystem comprises a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, the communication module communicates using wired or wireless media.

In some embodiments, the sensing module comprises a radar based sensor. In some embodiments, the sensing module comprises a vision based sensor. In some embodiments, the sensing module comprises a radar based sensor and a vision based sensor and wherein the vision based sensor and the radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a satellite based navigation system. In some embodiments, the sensing module comprises an inertial navigation system. In some embodiments, the sensing module comprises a satellite based navigation system and an inertial navigation system and the sensing module and/or the inertial navigation system are configured to provide vehicle location data. In some embodiments, the satellite based navigation system is a Differential Global Positioning Systems (DGPS), a BeiDou Navigation Satellite System (BDS) System, or a GLONASS Global Navigation Satellite System. In some embodiments, the inertial navigation system comprises an inertial reference unit.

In some embodiments, the sensing module comprises a vehicle identification device. In some embodiments, the vehicle identification device comprises RFID, Bluetooth, Wi-fi (IEEE 802.11), or a cellular network radio, e.g., a 3G, 4G, 5G, or 6G cellular network radio.

In some embodiments, the RIU subsystem is deployed at a fixed location near a road comprising automated lanes and, optionally, human-driven lanes. In some embodiments, the RIU subsystem is deployed at a fixed location near road infrastructure. In some embodiments, the RIU subsystem is deployed near a highway roadside, a highway onramp, a highway offramp, an interchange, intersection, a bridge, a tunnel, a toll station, or on a drone over a critical location. In some embodiments, the RIU subsystem is deployed on a mobile component. In some embodiments, the RIU subsystem is deployed on a vehicle drone over a critical location, on an unmanned aerial vehicle (UAV), at a site of traffic congestion, at a site of a traffic accident, at a site of highway construction, and/or at a site of extreme weather. In some embodiments, an RIU subsystem is positioned according to road geometry, traffic amount, traffic capacity, vehicle type using a road, road size, and/or geography of the area. In some embodiments, the RIU subsystem is installed on a gantry (e.g., an overhead assembly, e.g., on which highway signs or signals are mounted). In some embodiments, the RIU subsystem is installed using a single cantilever or dual cantilever support.

In some embodiments, the TCC network is configured to provide traffic operation optimization, data processing, and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. Pat. No. 10,380,886; U.S. Pat. App. Pub. No. 20190244521; U.S. Pat. App. Pub. No. 20190096238; U.S. patent application Ser. Nos. 16/454,268; and 16/505,034, each of which is incorporated herein by reference.

In some embodiments, the TCU network is configured to provide real-time vehicle control and data processing. In some embodiments, the real-time vehicle control and data processing are automated based on preinstalled algorithms. In some embodiments, the TCU network comprises a segment TCU or a point TCU based on based on the geographical area covered by the TCU network. See, e.g., U.S. Pat. No. 10,380,886; U.S. Pat. App. Pub. No. 20190244521; U.S. Pat. App. Pub. No. 20190096238; U.S. patent application Ser. Nos. 16/454,268; and 16/505,034, each of which is incorporated herein by reference. In some embodiments, the system comprises a point TCU physically combined or integrated with an RIU. In some embodiments, the system comprises a segment TCU physically combined or integrated with a RIU.

In some embodiments, the TCC network comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. Pat. No. 10,380,886; U.S. Pat. App. Pub. No. 20190244521; U.S. Pat. App. Pub. No. 20190096238; U.S. patent application Ser. Nos. 16/454,268; and 16/505,034, each of which is incorporated herein by reference.

In some embodiments, the TCU network comprises segment TCUs configured to process information from corridor and/or point TOCs and provide control targets to point TCUs; and point TCUs configured to process information from the segment TCU and RIUs and provide vehicle-based control instructions (e.g., detailed and time-sensitive control instructions for individual vehicles) to an RIU. See, e.g., U.S. Pat. No. 10,380,886; U.S. Pat. App. Pub. No. 20190244521; U.S. Pat. App. Pub. No. 20190096238; U.S. patent application Ser. Nos. 16/454,268; and 16/505,034, each of which is incorporated herein by reference.

In some embodiments, the RIU network provides vehicles with customized traffic information and control instructions (e.g., detailed and time-sensitive control instructions for individual vehicles) and receives information provided by vehicles.

In some embodiments, the TCC network comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, TCU network comprises one or more TCUs comprising a sensor and control module configured to provide the sensing and control functions of an RIU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 3G, 4G, 5G, 6G, and/or wireless (e.g., IEEE 802.11) radio. In some embodiments, the TCU network comprises one or more TCUs comprising a transmission and network module configured to provide communication network function for data exchange between an automated vehicle and a RIU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RIU. In some embodiments, the management and control methods of an RIU comprise local cooperative control of vehicles and roads, system monitoring, and emergency service. In some embodiments, the TCC network comprises one or more TCCs further comprising an application module and the service management module provides data analysis for the application module. In some embodiments, the TCU network comprises one or more TCUs further comprising an application module and the service management module provides data analysis for the application module.

In some embodiments, the TOC comprises interactive interfaces. In some embodiments, the interactive interfaces provide control of the TCC network and data exchange. In some embodiments, the interactive interfaces comprise information sharing interfaces and vehicle control interfaces. In some embodiments, the information sharing interfaces comprise an interface that shares and obtains traffic data; an interface that shares and obtains traffic incidents; an interface that shares and obtains passenger demand patterns from shared mobility systems; an interface that dynamically adjusts prices according to instructions given by the vehicle operations and control system; and/or an interface that allows a special agency (e.g., a vehicle administrative office or police) to delete, change, and/or share information. In some embodiments, the vehicle control interfaces comprise an interface that allows a vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other shared mobility systems. In some embodiments, traffic incidents comprise extreme conditions, major and/or minor accident, and/or a natural disaster. In some embodiments, an interface allows the vehicle operations and control system to assume control of vehicles upon occurrence of a traffic event, extreme weather, or pavement breakdown when alerted by the vehicle operations and control system and/or other shared mobility systems. In some embodiments, an interface allows vehicles to form a platoon with other vehicles when they are driving in the same automated vehicle dedicated lane.

In some embodiments, the VIU comprises a communication module configured to communicate with an RIU. In some embodiments, the VIU comprises a communication module configured to communicate with another VIU. In some embodiments, the VIU comprises a data collection module configured to collect data from external vehicle sensors and internal vehicle sensors; and to monitor vehicle status and driver status. In some embodiments, the VIU comprises a vehicle control module configured to execute control instructions for driving tasks. In some embodiments, the driving tasks comprise car following and/or lane changing. In some embodiments, the control instructions are received from an RIU. In some embodiments, the VIU is configured to control a vehicle using data received from an RIU. In some embodiments, the data received from the RIU comprises vehicle control instructions (e.g., detailed and time-sensitive control instructions for individual vehicles); travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, a VIU is configured to send data to an RIU. In some embodiments, the data sent to the RIU comprises driver input data; driver condition data; and/or vehicle condition data. In some embodiments, the driver input data comprises origin of the trip, destination of the trip, expected travel time, and/or service requests. In some embodiments, the driver condition data comprises driver behaviors, fatigue level, and/or driver distractions. In some embodiments, the vehicle condition data comprises vehicle ID, vehicle type, and/or data collected by a data collection module.

In some embodiments, the VIU is configured to collect data comprising vehicle engine status; vehicle speed; surrounding objects detected by vehicles; and/or driver conditions. In some embodiments, the VIU is configured to assume control of a vehicle. In some embodiments, the VIU is configured to assume control of a vehicle when the automated driving system fails. In some embodiments, the VIU is configured to assume control of a vehicle when the vehicle condition and/or traffic condition prevents the automated driving system from driving the vehicle. In some embodiments, the vehicle condition and/or traffic condition is adverse weather conditions, a traffic incident, a system failure, and/or a communication failure.

Although the disclosure herein refers to certain illustrated embodiments, it is to be understood that these embodiments are presented by way of example and not by way of limitation.

EXAMPLE

The technology provides coordinated sensing; coordinated prediction and decision-making; and coordinated control for transportation management and operations and control of connected automated vehicles. The technology provides an automated driving system comprising a Connected Automated Vehicle Subsystem that interacts in real-time with a Connected Automated Highway Subsystem. Components of the CAV and CAH subsystems comprise a variety of hardware and software components. During the development of embodiments of the technology provided herein, components of the coordinated control technology were designed, built, and tested. Further, during the development of embodiments of the technology provided herein, specifications and performance characteristics of the technology were identified.

LIDAR

Embodiments of the technology comprise use of LIDAR. In exemplary embodiments, the technology comprises use of LIDAR hardware providing rapid scanning over a 360° field of view and having an effective detection distance greater than 50 m with a detection error of 5 cm at 99% confidence. Some commercial LIDAR hardware products may find use in embodiments of the technology provided herein, e.g., R-Fans_15 from Beijing Surestar Technology Co., Ltd (www.isurestar.com/index.php/en-product-product.html#9), TDC-GPX2 LIDAR from precision-measurement-technologies (pmt-fl.com), and HDL-64E from Velodyne Lidar (velodynelidar.com/index.html). In exemplary embodiments, the technology comprises use of LIDAR software that measures the distance between two vehicles, measures the distance between carriageway markings and vehicles, and/or that measures the angle of vehicles with respect to central lines. Some commercial LIDAR software products may find use in embodiments of the technology provided herein, e.g., LIDAR in ArcGIS. These and other commercial hardware and software products meet the technical specifications of embodiments of the technology provided herein.

Imaging and Cameras

Embodiments of the technology comprise use of imaging (e.g., camera) technology. In some embodiments, imaging (e.g., imaging hardware and/or imaging software) is/are used to detect vehicles, pedestrians, and/or other objects; to recognize traffic signs; and/or to identify lane markings. In exemplary embodiments, the technology comprises use of imaging hardware providing imaging over a wide angle (e.g., approximately 170° field of view) at a high resolution. In some embodiments, the imaging hardware provides night vision (e.g., infrared, low or dim light sensitivity, or other night vision capabilities). In exemplary embodiments, the technology comprises use of imaging software providing vehicle detection (e.g., vehicle detection having a sensitivity (true positive rate) of 99% with 90% or greater confidence) and lane detection (e.g., lane detection having a sensitivity (true positive rate) of 99% with 90% or greater confidence. In some embodiments, the imaging software is configured to identify a drivable path using image data. In some embodiments, the imaging software is configured to measure and/or calculate the position, speed, and/or acceleration of other vehicles (e.g., passing vehicles). Some commercial imaging products may find use in embodiments of the technology provided herein, e.g., EyEQ4 from Mobileye (www.mobileye.com/ourtechnology).

While extant automated driving technologies comprise use of cameras installed on vehicles, embodiments of the technology described herein comprise use of cameras installed on infrastructure. In some embodiments, cameras installed on infrastructure are used to determine a drivable area on a road and delimiters of the drivable area, recognize the geometry of routes within a drivable area, and/or recognize multiple (e.g., all) road users within a drivable area or drivable path.

In some embodiments, the technology comprises use of barrier and guardrail detection (e.g., as described in U.S. Pat. App. Pub. No. US20120105639A1, incorporated herein by reference). In some embodiments, the technology comprises use of an image processing system (e.g., as described in EP2395472A1, incorporated herein by reference). In some embodiments, the technology comprises use of a camera mount (e.g., as described in U.S. Pat. App. Pub. No. US20170075195A1). In some embodiments, the technology comprises use of path prediction (e.g., as described in U.S. Pat. App. Pub. No. US20150325753A1, incorporated herein by reference). In some embodiments, the technology comprises use of road vertical contour detection (e.g., as described in U.S. Pat. App. Pub. No. US20130141480A1, incorporated herein by reference).

In some embodiments, imaging technologies use artificial intelligence, neural networks, and/or machine learning to process images and identify components of images (e.g., vehicles, signs, pedestrians, objects, lane markings, barriers and guardrails) and/or to identify drivable paths. In some embodiments, imaging technologies use supervised learning, reinforcement learning, and/or deep learning technologies.

Radar and Microwave Radar

Embodiments of the technology comprise use of radar technology (e.g., microwave radar technology). In some embodiments, the technology comprises use of radar (e.g., microwave radar) hardware. In some embodiments, radar hardware provides reliable detection accuracy. In some embodiments, radar hardware provides automatic lane segmentation on a multi-lane road. In some embodiments, the radar hardware provides vehicle speed data, traffic flow data, and/or vehicle occupancy with errors less than 5%. In some embodiments, the radar hardware performs reliably at temperatures lower than −10° C. Some commercial radar hardware products may find use in embodiments of the technology provided herein, e.g., the STJ1-3 from Sensortech (www.whsensortech.com) or Municipal Warning Cameras from TrafficLOGIX (TrafficLogix. Municipal Warning Cameras data sheet. (trafficlogix.com/sp-guardian-enforcer-camera-system/) accessed Feb. 3, 2023). In some embodiments, the technology comprises use of radar (e.g., microwave radar) software. In some embodiments, the radar software is configured to measure and/or calculate the position, speed, acceleration, and/or volume of other vehicles (e.g., passing vehicles). Some commercial radar software products may find use in embodiments of the technology provided herein, e.g., some radar software uses an algorithm to convert radar data to traffic information. These and other commercial hardware and software products meet the technical specifications of embodiments of the technology provided herein.

Communication

Embodiments of the technology comprise use of communications technology (e.g., for communication with vehicles and/or for communication with infrastructure (e.g., TCU)). In some embodiments, the technology comprises use of communications hardware. In some embodiments, communications hardware (e.g., for communication with vehicles) conforms with the IEEE 802.11p-2010 standard. In some embodiments, communications hardware provides a bandwidth of approximately 10 MHz and data rates of approximately 10 Mbps. In some embodiments, communications hardware operates at a frequency band of 5 GHz. In some embodiments, communications hardware has a Doppler spread of 800 km/hour and a delay spread of 1400 ns. In some embodiments, the communications hardware is powered by a 12 V or 24 V source. In some embodiments, the communications hardware operates with an antenna diversity that is a cyclic-delay transmit diversity (CDD). Some commercial hardware products may find use in embodiments of the technology provided herein, e.g., MK5 V2X from Cohda Wireless (cohdawireless.com) or the StreetWAVE from Savari (savari.net/technology/road-side-unit). In some embodiments, the technology provided herein has an improved stability with respect to extant technologies, e.g., to provide reliable communications for a complex driving environment.

In some embodiments, communications hardware (e.g., for communication with infrastructure (e.g., TCU)) conforms with the ANSI/TIA/EIA-492AAAA and 492AAAB standard. In some embodiments, communications is provided over communications media that is optical fiber. In some embodiments, communications hardware performs reliably in environmental operating ranges of approximately −40° C. to 55° C. Some commercial hardware products may find use in embodiments of the technology provided herein, e.g., Optical Fiber from Cablesys (www.cablesys.com/fiber-patch-cables).

Computation Device

In some embodiments, the technology comprises computation devices and/or systems. In some embodiments, a computation device and/or system integrates data from multiple sensors. In some embodiments, a computation device and/or system (e.g., configured to integrate data from multiple sensors) provides accurate estimation of the position and orientation of vehicles, high-resolution estimation of traffic state, autonomous planning of driving paths, and/or real-time detection of incidents. One example of a computation system provided as a module for a vehicle is the External Object Calculating Module (EOCM) from General Motors, which is provided in the active safety systems of certain vehicles. The exemplary EOCM system integrates data from different sources (e.g., a camera, radar, and other sensors) to provide decision-making functions and processes (see, e.g., U.S. Pat. No. 8,527,139, incorporated herein by reference).

Data Processing

In some embodiments, the technology comprises systems and/or methods for data processing. For example, in some embodiments, data processing comprises use of data fusion technology. Some commercial data fusion products may find use in embodiments of the technology provided herein, e.g., data fusion products from DF Tech to provide accurate and efficient integration of data and information from multiple sources. The data fusion products also provide backup services to address problems with sensor function and/or sensor data.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:
1. An automated driving system (ADS) comprising:
a connected automated highway (CAH) subsystem comprising roads and an intelligent road infrastructure system (IRIS) comprising a roadside intelligent unit (RIU), a traffic control center (TCC), and a traffic control unit (TCU); and
a connected automated vehicle (CAV) subsystem comprising a CAV, wherein said CAV comprises a vehicle intelligent unit (VIU);
wherein said ADS provides a coordinated control system comprising a coordinated sensing subsystem, a coordinated prediction and decision-making subsystem, and a coordinated control subsystem;
wherein said TCC performs mesoscopic-level weather prediction;
wherein said RIU collects and fuses traffic state information to provide fused RIU data;
wherein said VIU fuses data from the CAH and vehicle emergency obstacle avoidance information to provide fused VIU data;
wherein the TCC fuses the fused RIU data and the fused VIU data to produce a complete traffic scene;
wherein TCC sensing data and VIU sensing data are fused to provide fused macroscopic data and/or fused microscopic data describing traffic and/or vehicle characteristics;
wherein the TCC integrates sensing information provided by the VIU and sensing information provided by the RIU with other information; and
wherein said ADS is configured to provide coordinated control of automated driving at an intelligence level S=1, 2, 3, 4, or 5 during vehicle operation for the CAV operating at an intelligence level V during vehicle operation on a connected automated highway (CAH) operating at an intelligence level I during vehicle operation, and wherein the intelligence level I is greater than the intelligence level V, and the ADS manages the CAV and the IRIS to facilitate vehicle operations and controls during vehicle operation.

2. The ADS of claim 1, further comprising a traffic operation center (TOC).

3. The ADS of claim 1, further comprising a supporting subsystem.

4. The ADS of claim 1, wherein said RIU is configured to sense and/or fuse traffic state information, communicate traffic state information, and/or issue control instructions.

5. The ADS of claim 1, wherein said RIU comprises a coordinated sensing module, a computing and fusion module, a communication module, and/or a position module.

6. The ADS of claim 1, wherein said TCU is configured to collect information from RIUs, communicate information with another TCU, process information, receive instructions from a TCC, issue instructions, and/or integrate local and global control decisions.

7. The ADS of claim 1, wherein said TCU comprises a data-exchange and control module, a communication module, a service management module, an application module, and/or an interactive interface.

8. The ADS of claim 1, wherein said TCC is configured to control hardware devices and/or functional service interaction of said IRIS system, support intelligence distribution, and/or execute automated driving control.

9. The ADS of claim 1, wherein said TCC is configured for connectivity and/or data exchange.

10. The ADS of claim 1, wherein said TCC comprises a data service module, a transmission module, a service management module, a management application module, and/or a user interaction interface.

11. The ADS of claim 1, wherein said intelligence level V is less than 2 or is 1.5.

12. The ADS of claim 1, wherein said CAV comprises a vehicle intelligent unit (VIU).

13. The ADS of claim 12, wherein said VIU interacts with said CAH subsystem and cooperates with said IRIS subsystem to provide coordinated control of said CAV.

14. The ADS of claim 12, wherein said VIU is configured to provide computing functions, communication functions, and/or execution functions for automated driving.

15. ADS of claim 12, wherein said VIU is supported by an onboard sensing module, an onboard computing module, an onboard execution module, and/or an onboard communication module.

16. The ADS of claim 2, wherein said TOC is configured to exchange information in real time with a TCC; publish driving environment-related information to vehicles and/or an IRIS; calculate an automated driving service fee; collect and distribute external information; and/or provide roadway operations, maintenance management, construction services, and/or rescue services.

17. The ADS of claim 1, configured to provide coordinated sensing, coordinated prediction and decision-making, and/or coordinated control.

18. The ADS of claim 1, configured to perform a coordinated sensing method, a coordinated prediction and decision-making method, and/or coordinated control method.

19. The ADS of claim 1, configured to perform a method for coordinated control of CAV, said method comprising distributing vehicle control and traffic management strategies from a TCC and implementing vehicle control and traffic management instructions by a RIU sending vehicle control instructions from said RIU to a CAV and said CAV executing said vehicle control instructions.

20. The ADS of claim 1, configured to perform a method for coordinated control of CAV, said method comprising sending vehicle control instructions from a RIU to a VIU, wherein said control instructions comprise instructions for vehicle throttle, brake, and steering angle; and executing said control instructions by a CAV.

* * * * *